United States Patent [19]

Chan et al.

[11] Patent Number: 4,546,429

[45] Date of Patent: Oct. 8, 1985

[54] INTERACTIVE COMMUNICATION CHANNEL

[75] Inventors: Robert H. G. Chan, Mt. Laurel Township, Burlington County; Martin R. Mann, Princeton Township, Mercer County; John A. Ciarrocchi, Haddon Heights Borough, all of N.J.

[73] Assignee: The United States of America as represented by the Secretary of the Air Force, Washington, D.C.

[21] Appl. No.: 686,954

[22] Filed: Dec. 27, 1984

Related U.S. Application Data

[63] Continuation-in-part of Ser. No. 387,581, Jun. 11, 1982, abandoned.

[51] Int. Cl.[4] .............................................. G06F 3/00
[52] U.S. Cl. ................................................... 364/200
[58] Field of Search ... 364/200 MS File, 900 MS File

[56] References Cited

U.S. PATENT DOCUMENTS

| T940,019 | 11/1975 | Larson | 444/1 |
|---|---|---|---|
| 3,582,896 | 6/1971 | Silber | 364/300 |
| 3,676,858 | 9/1970 | Finch et al. | 364/200 |
| 4,016,548 | 4/1977 | Law et al. | 370/77 |
| 4,067,059 | 1/1978 | Derchak | 364/200 |
| 4,075,691 | 2/1978 | Davis et al. | 364/200 |
| 4,075,694 | 2/1978 | Ericsson | 364/200 |
| 4,133,030 | 1/1979 | Heuttner et al. | 364/200 |
| 4,281,315 | 7/1981 | Bauer et al. | 340/147 R |
| 4,328,543 | 5/1982 | Brickman et al. | 364/200 |

Primary Examiner—James D. Thomas
Assistant Examiner—David Y. Eng
Attorney, Agent, or Firm—Donald J. Singer; William G. Auton

[57] ABSTRACT

An interactive communications channel (ICC) for providing a digital computer with high-performance multi-channel interfaces. Sixteen full duplex channels can be serviced in the ICC with the sequence or scan pattern being programmable and dependent upon the number of channels and their speed. A channel buffer system is used for line interface, and character exchange. The channel buffer system is on a byte basis. The ICC performs frame start and frame end functions, bit stripping and bit stuffing. Data is stored in a memory in block format (256 bytes maximum) by a program control and the ICC maintains byte address information and a block byte count. Data exchange with the memory is made by cycle steals. Error detection is also provided for using a cyclic redundancy check technique.

8 Claims, 16 Drawing Figures

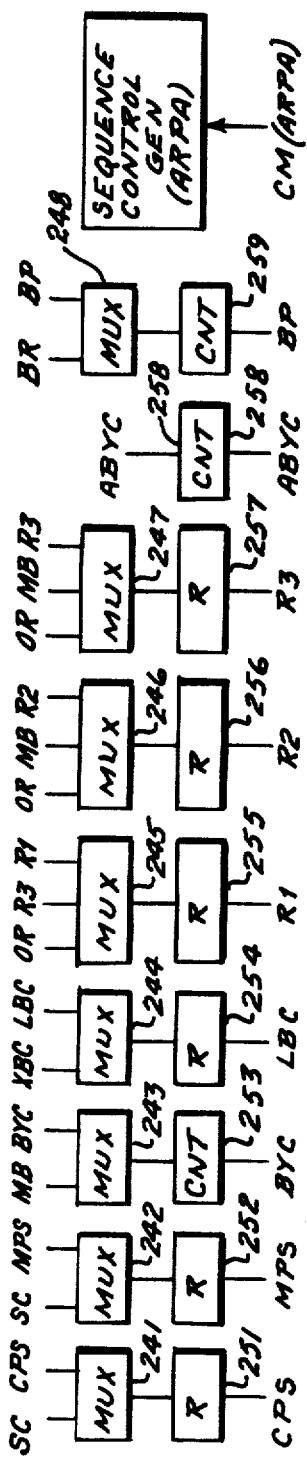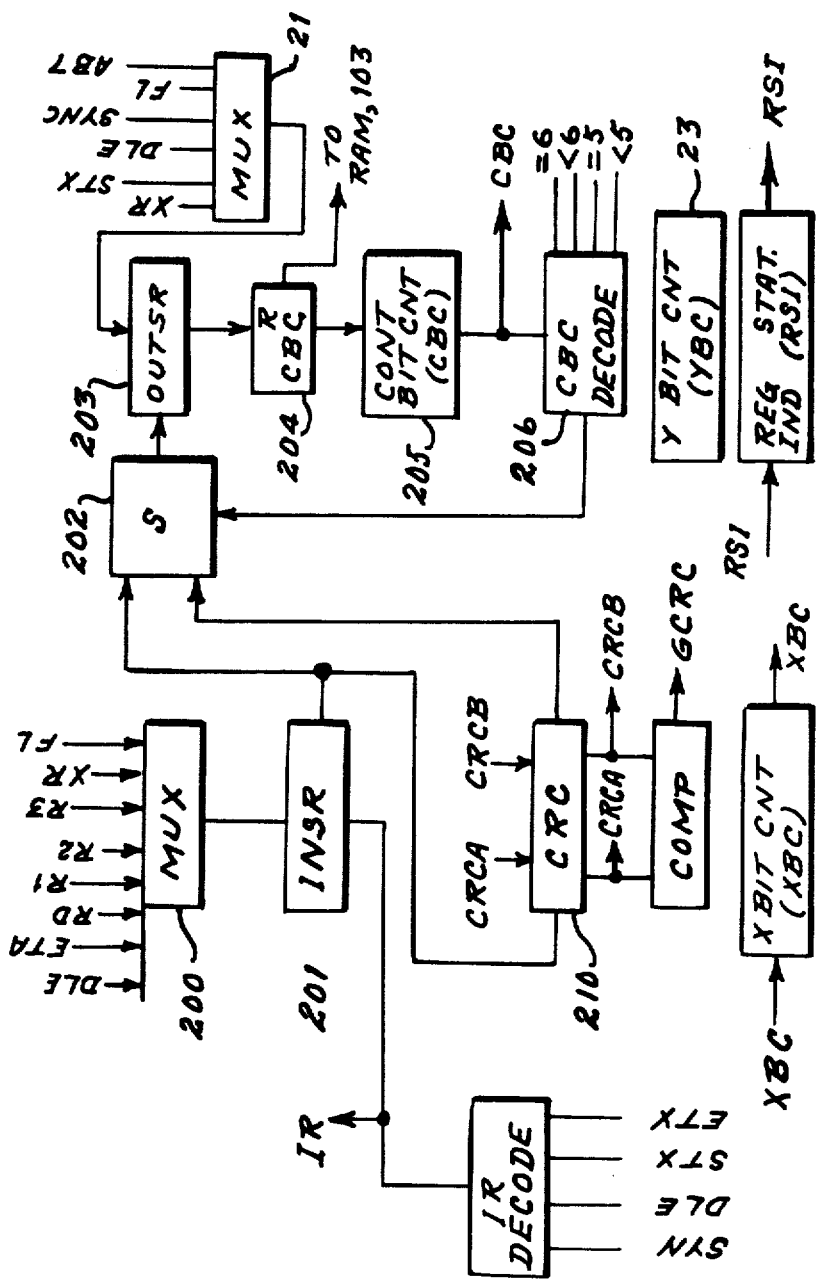
FIG. 2

INTERACTIVE COMMUNICATION CHANNEL

STATEMENT OF GOVERNMENT INTEREST

The invention described herein may be manufactured and used by or for the Government for governmental purposes without the payment of any royalty thereon.

CROSS-REFERENCE TO RELATED APPLICATION

This application is a continuation-in-part of application Ser. No. 387,581, filed June 11, 1982, now abandoned.

BACKGROUND OF THE INVENTION

This invention relates to automatic digital switching-/digital processing telecommunications systems and in particular to an interactive communication channel that provides line interface between the duplex serial data channels and the computer in such systems.

Systems of the type to which the invention applies generally comprise a common storage unit storing data and programs and processing units inter-operating with multiple duplex channel devices. U.S. Pat. No. 3,906,151 of Gunter Grossmann et al entitled *Method and Apparatus of Signal Conversion in Program Controlled Automatic Data Exchanges*, issued Sept. 16, 1975 discloses a system that is typical of the state of the art.

Such systems, however, have various limitations that the present invention seeks to overcome For example, current systems are sometimes: limited in the number of channels they can handle effectively; limited in the speed at which it can process data; transmit undetected errors; require additional processing hardware and memory to accommodate bit stuffing for code transparancy; and require special programs and processing techniques to accommodate different data transmission speeds on different data channels. Individually these limitations have been overcome to varying degrees in various existing systems For instance, the data transmission speed problem is solved by De Ver C. Finch et al in their U.S. Pat. No. 3,676,858 entitled *Method, Apparatus and Computer Program for Determining the Transmission Rate and Coding Configuration of Remote Terminals*, filed July 11, 1972. However, like current solutions to the various other limitations the solution requires the addition of complex techniques, programs and apparatus.

In view of the foregoing discussion, it is apparent that there currently exists the need for an improved I/O interface for automatic digital telecommunications systems that is not subject to the above itemized limitations. The present invention is directed toward satisfying that need.

SUMMARY OF THE INVENTION

The Interactive Communication Channel (ICC) of the invention provides termination for frame formatted synchronous communication lines in an automatic data processing telecommunications system. Line interface between the system computer and duplex data channels is made via the Channel Buffer System. Character exchange with the Channel Buffer System is on a byte basis. The ICC provides frame start and frame end procedures as well as bit stuffing requirements. Data is stored in memory in block format The ICC maintains byte address information and block byte count. Data exchange with memory is made by cycle steals.

Information exchange with the systems computer central processing unit (CPU)) for character processing data is accomplished by memory transfers. Designated memory locations are used for this purpose. When directed to do so by the CPU, the ICC accesses the designated location to read control information. At the conclusion of frame transfer, the ICC writes termination information into memory followed by a termination interrupt.

The CPU controls ICC operation by the use of command indicators. These permit the CPU to initiate ICC operations.

Channel servicing in the ICC is provided in a channel service period. In this period the transmit and receive lines of a full duplex channel are serviced. All data exchanges in a period are related to the particular channel being serviced. The channel service sequence or scan pattern is programmable and depends upon the number of channels and their speed.

Operation of the input function of the ICC is as follows:

When the start of a frame is recognized, the ICC extracts a Buffer Area List Entry (BALE) from a designated location in memory. The BALE indicates if the buffer area is available, the starting half word boundary, and the block size in bytes. The ICC transfers data and cyclic redundancy check CRC characters (excluding stuffed bits) into memory via memory steal cycles. With each memory transfer (two bytes of data) the memory address is incremented and the byte count reduced by two. If the byte count reaches zero before the frame is completed, the Bale pointer is incremented and a second BALE read. A second data block is started and memory address and block size maintained as in the first block. The process continues until a Flag character is detected, this indicates completion of the frame.

A CRC accumulation is made for all received bytes except Flag characters. At frame completion a CRC test is made to determine if any transmission errors had occurred.

A Bale is written into memory at frame completion and provides a last block indicator and the block size remainder. The block size remainder is the byte count reduced by one for each data byte received and stored. CRC characters not included.

A Termination Entry is also written into memory. The location of this entry is based upon a rotating counter maintained by the ICC. It provides information necessary to process the frame; channel number, last block BALE pointer and error data.

Finally, an interrupt is generated after the Bale and Termination Entry are in memory to inform the CPU that a received frame requires processing.

Operation of the output function of the ICC is as follows:

Each channel has a timer which indicates when a new message test is to be made. The Bale of each inactive send channel is accessed and an Act bit tested. All channels for which a reset act bit is found become active. The Bale provides additional information for activated channels, the data block starting double word boundary, a last block indicator, block byte count, and the last byte bit count.

The ICC reads data from memory for transfer to the Channel Buffer. It provides bit stuffing when required and accumulates the CRC character. Two data bytes are read at a time and with each transfer the byte count is reduced by two and memory address incremented. At the completion of the first data block and assuming it was not indicated as the last block the Bale counter is incremented and a second Bale access is made. A second block is started and data continues to be read. New blocks will continue to be accessed until one which contains a last block indicator is found. When this block is completed, the CRC characters are appended to the transmitted message. At least two Flag characters will also be transmitted. A new message may start at this time, but if none are available the channel buffer will be provided with flag characters.

The ICC informs the CPU of the completion of frame transmission by writing a termination entry into memory and raising an interrupt. The termination entry contains the same information as that of input function.

An abort sequence may occur for an active output channel. This will result if a memory access is not honored. The message will be aborted and a termination entry and interrupt generated. The first bale of the aborted message will be tested for a reset act bit to resume transmission on the channel.

The ICC hardware comprises a random access memory (RAM) and a variety of registers, shifter registers, multiplexers and counters. Information for any channel is transferred from the RAM to the registers and counters during scanning of that channel and returned if no channel securing is required. If channel securing is required the updated data is read back into the RAM.

It is a principal object of the invention to provide a new and improved interactive communications channel for use in digital telecommunication systems.

It is another object of the invention to provide an interactive communications channel capable of interfacing up to 16 full duplex data channels.

It is another object of the invention to provide an interactive communications channel that can process digital data with a maximum total throughput of two megabits per second.

It is another object of the invention to provide an interactive communications channel having an improved error checking function.

It is another object of the invention to provide an interactive communications channel capable of automatically providing bit stuffing and stripping.

It is another object of the inventon to provide interactive communications channel that automatically accommodates different data transmission speeds on different data channels.

These, together with other objects, features and advantages of the invention will become more readily apparent from the following detailed description when taken in conjunction with the illustrative embodiment in the accompanying drawings.

DESCRIPTION OF THE DRAWINGS

FIG. 2 is a block diagram of the interaction communications channel process units;

DETAILED DESCRIPTION OF THE PREFERRED EMBODIMENT

Figure 1:
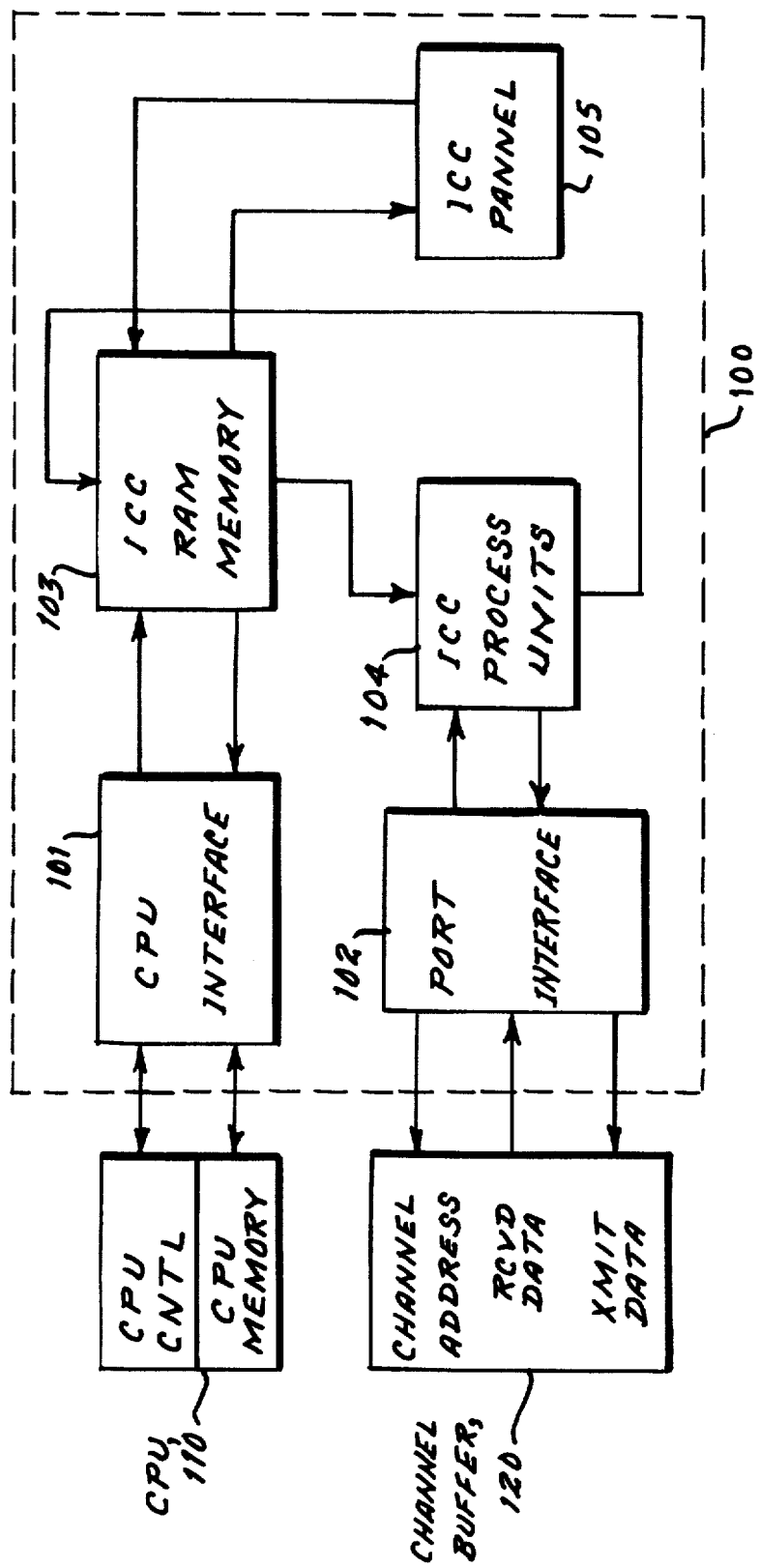
FIG. 1 is a block diagram of the interactive communications channel of the present invention.

The interactive communications channel (ICC) of the present invention is an input-output multiplexer system that provides an interface between the central processing unit (CPU) of a telecommunications system, and a channel buffer which terminates sixteen full duplex serial data links. The information exchange between the CPU and the channel buffer is accomplished by the ICC on a byte basis. The ICC provides frame start and frame end procedures as well as bit stuffing requirements. Data is stored in memory in block format. The ICC maintains byte address information and block byte count Data exchange with memory is made by cycle steals.

The ICC is divided into five subsystems to accomplish the functions described above FIG. 1 is a block diagram of the five sybsystems of the ICC. The five subsystems are: The CPU interface 101, the device port interface 102, the ICC random access memory subsystem 103, the ICC process units 104, and the ICC display panel 105.

The device port interface 102 sends and receives data from the sixteen duplex channels by interfacing with a channel buffer 120. The channel buffer 120 itself is not part of the ICC, and may be any one of a number of commercially available communication data buffers that can receive signals from duplex serial data links, and pass on that information to the device port interface 102 in the form of a bit serial data stream. As shown in FIG. 1, the device port interface 102 is simply a bus that transmits and receives data between the channel buffer 120 and the ICC process units 104.

The ICC process units 104 contain the logic elements to process, receive, and transmit messages. The ICC process units 104 perform certain key functions so that the Advanced Digital Communications Control Protocol (ADCCP) can be employed on these synchronous data links. These functions include bit stuffing and destuffing, generation and recognition of "Flag" character and Cyclic Redundancy Check (CRC) generation and validation for each simplex termination.

The ICC random recess memory (RAM) subsystem 103 provides storage for the data necessary to process all channel messages. The RAM subsystem 103 contains: a random access memory which provides 256 bits of RAM storage for each of the 16 duplex channels, four multiplexers, which conduct all received incoming messages and processing data from the ICC process units to the RAM, and five output registers for passing messages and processing data out of the RAM subsystem to the CPU interface 101 and the ICC process units 104 as required.

The CPU interface 101 is an interface between the ICC RAM subsystem 103 and the CPU 110 of the telecommunication system. This interface conducts all message traffic between the ICC RAM the CPU memory, as well as control signals from the CPU into the ICC. Information exchange between the ICC and the Central Processing Unit 110 of the telecommunicatons system computer is accomplished via Direct Memory Access techniques for both data transfers and control transfers. Fixed memory locations are accessed by the ICC to read control information when appropriate conditions occur. Data is stored in CPU memory in frame or packet format. The ICC enters or extracts data packets by maintaining byte address and byte count information for each simplex data channel.

The ICC display panel 105 provides a means to perform initial ICC checkout and maintanance. A display of all time slots, the selection of operational modes, and the selection of timing modes are among the functions available on the display panel 105.

Figure 3:
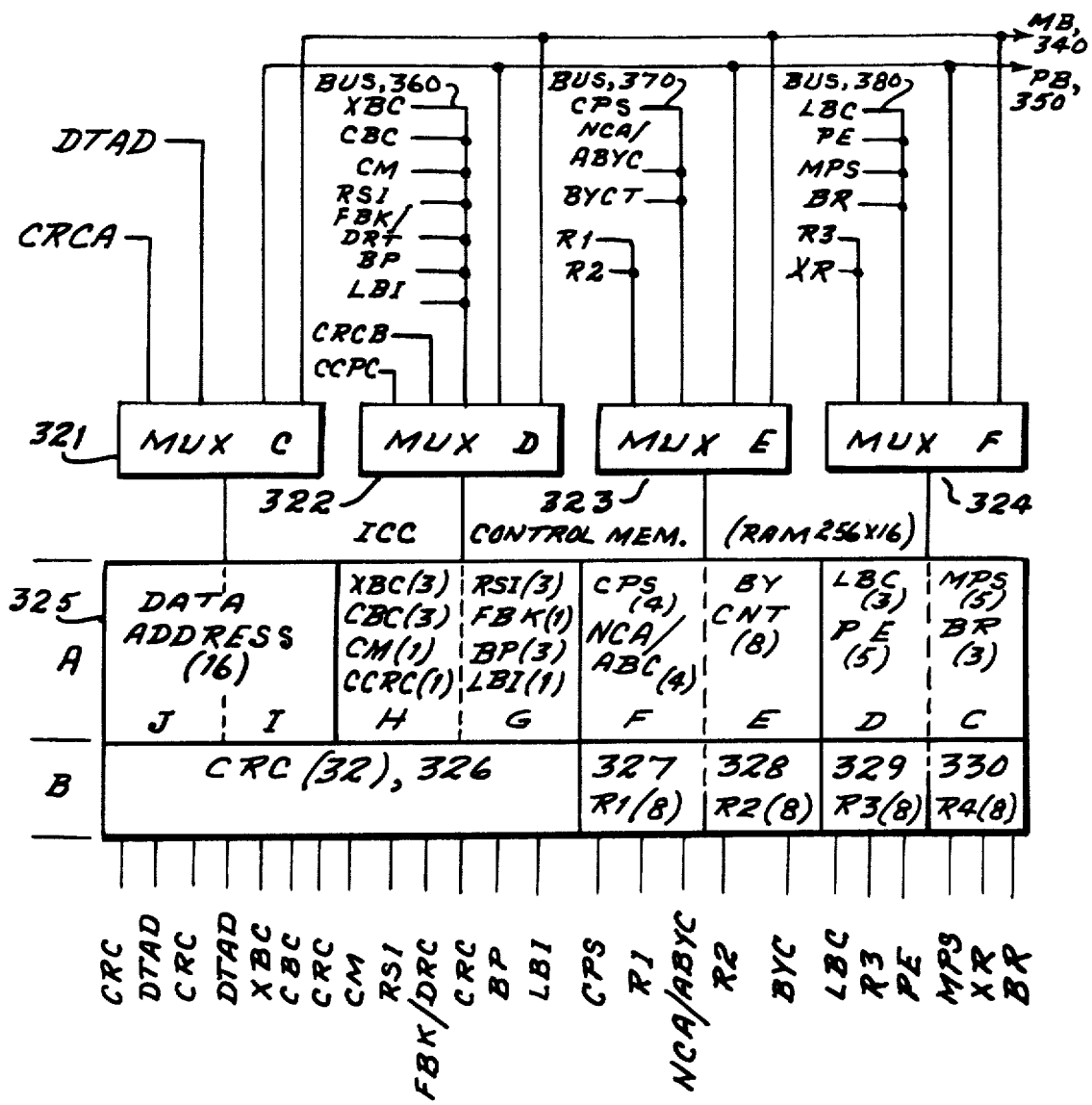
FIG. 3 is a block diagram of the memory means that compose the random access memroy subsystem.
Figure 4:
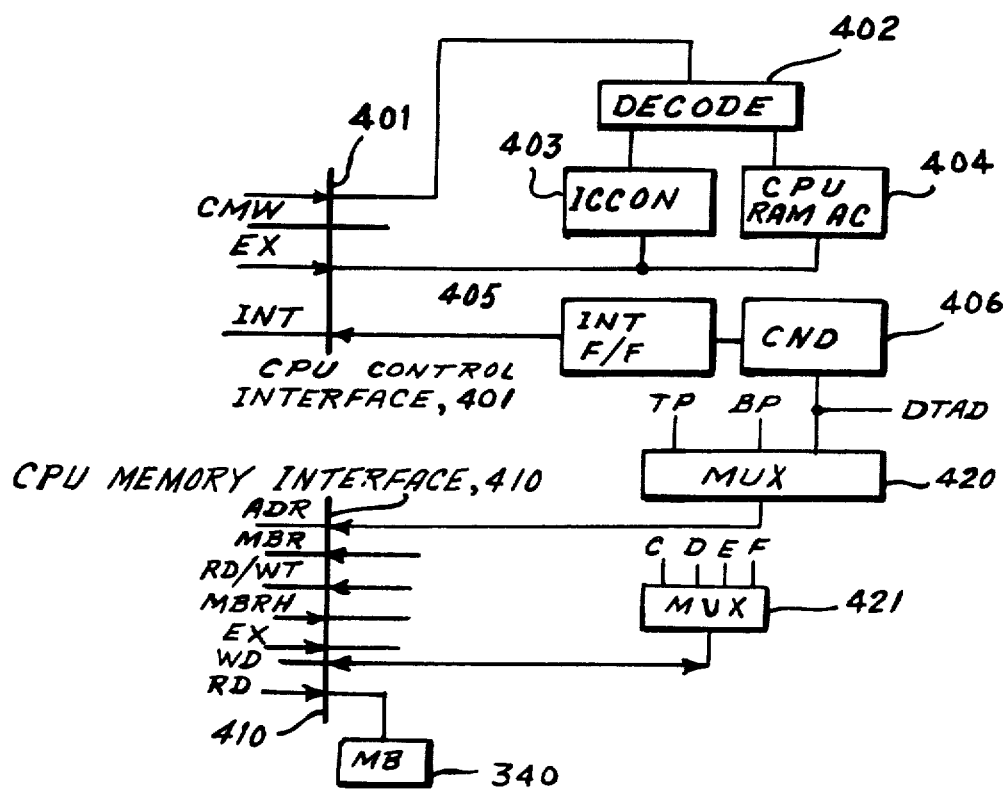
FIG. 4 is a block diagram of the central processor unit interface.

FIG. 2 is a detailed block diagram of the ICC process units 104 subsystem of the present invention; FIG. 3 is a detailed block diagram of the ICC random access memory subsystem 103; and FIG. 4 is a detailed block diagram of the CPU interface 101. The function and operation of the above subsystems are perhaps best described by the following description of the operation of the ICC, which identifies each step of the input and output activities with each element of the ICC subsystems which perform those steps.

The operation of the ICC in the input mode begins when a non-flag character is received by the device port interface 102 from the channel buffer 120. A flag character is the binary sequence: 01111110, which has some specific functions which will be discussed. Note that the presence of a flag character is provided by all users of a system which incorporates ADCCP protocol. Hence the flag character will automatically accompany incoming message traffic, and need not be provided by the channel buffer.

An incoming message is conducted from the port interface 102 into the message multiplexer 200, of the device port interface in FIG. 2, on the receive data (RD) terminal. The serial data signal is then conducted by the input shift register (INSR) 201, which provides a path to a bit stuffing unit (S) 202.

The bit stuffing unit 202 is a device that provides bit stuffing and unstuffing. It removes stuffed bits from all incoming messages, and provides stuffed bits to all outgoing messages. The determination of the presence of stuffed bits as well as the presence of a flag character, is made by the elements enumerated as 203-206, which are in a loop that feeds back into the bit stuffing unit 202.

The output shift register (OUTSR) 203 and output register 204 initially provide a data path for input data into control bit center 205. The control bit counter 205 is used to detect flags and stuffed bits by simply counting bits on all data The bit count and data are then sent to the CBC decode 206, which tests the data for six consecutive binary 1's in a sequence (which indicates a flag character). When five consecutive binary 1's are detected, the next binary 0 is a stuffed bit, which will be removed by the bit stuffing unit 202

Once the stuffed bits have been removed from incoming data by the unit 202, the data is conducted by the output shift register 203 and output register 204 to the ICC random access memory subsystem 103.

The ICC process units also perform a cyclic redundancy check (CRC) run for all message traffic which enters or leaves the ICC. The CRC run is performed by the CRC register 210, which receives data from the input shift register 201. The CRC register simply makes an accumulation or CRC sum for all received bytes which is also conducted through the unit 202, output shift register 203, and output register 204 to the ICC RAM subsystem. If and when the ICC is directed to retransmit that message, a CRC test run will be performed by that register 210 to check the message for errors. The CRC is delivered with the data as part of the message.

FIG. 3 is a detailed block diagram of all the elements that make up the ICC random access memory subsystem 103 of FIG. 1. The RAM subsystem contains: four 16 bit multiplexers 321-324, a RAM memory 325 which provides 256 bits of RAM storage for each of the 16 duplex channels, and five output registers 326-330, for passing messages and data out of the RAM subsystem to the CPU interface 101 and the ICC process units 104 as required.

The actual message data of incoming messages is conducted from the ICC process units at the output register 204, and enters the RAM subsystem over bus 370 over the R1 and R2 terminals, through MUX E, 323, into the RAM 325 itself. With each memory transfer, two bytes of data are exchanged. Therefore, the data will eventually be transferred out register one 327 and register two 328 through the CPU interface to the CPU memory.

At this point, in addition to preparing to transferring the data itself to the CPU memory, the ICC also extracts some "traffic management" type data from the ICC RAM 325, which is associated with that particular message. The particular "traffic management" datas is known as a Buffer Area List Entry (BALE). The BALE indicates if the buffer area is available, the starting halfword boundary, and the block size, in bytes. If the Buffer Area is available, the ICC transfers data and part of the Cyclic Redundancy Check (CRC) Characters into the CPU memory via memory steal cycles.

As mentioned in the discussion of the ICC process units 103, before storing this data, the ICC strips out any "stuffed" zeros inserted in the data stream to maintain code transparency. Therefore, stuffed zeros and flags are not stored as part of the data in the CPU memory. With each memory transfer two bytes of data are exchanged, the memory address is incremented and the byte count is reduced by two. If the byte count reaches zero before the frame is completed, a Bale pointer is incremented and a second BALE is read.

Each data block requires a Buffer Address List Entry (BALE). A BALE consists of two half words. The half words of a BALE contain the following information:

| 1st BALE Halfword - | Act Bit | 1 bit |
|---|---|---|
| | Last block indicator | 1 bit |
| | Byte count | 8 bits |
| | Bit count | 3 bits |
| | Channel out of service | 1 bit |
| | Spare | 2 bits |
| 2nd BALE Halfword - | Block address | 16 bits |
| | (Address is on a half word boundary.) | |
| | (Buffer address capability is 64E half | |

The BALE information, as shown in FIG. 3, is located in and extracted from the ICC RAM 325 where it will be conducted with the data through the CPU interface 110 to the CPU memory as follows:

The data address (DTAD) is conducted out of the RAM 325, through the cycle redundancy check (CRC) register 326, to the CPU interface, along with the last block indicator (LBI), byre count (BYC), bit count (XBC). The other elements of the BALE word will be discussed later.

Additionally, some elements of the BALE word are also input back into the ICC process units 104 for updating. For example, since two bytes of data are exchanged with each memory transfer, the byte count number in the RAM needs to be reduced by two each time a message is input into the CPU memory. Also, the byte count needs to be increased by two when a message is removed from the CPU memory. The updating of the byte count is accomplished by: having the old byte count leave the ICC RAM 325 by register two 328; the byte count enters the ICC process unit 104 with a signal from the memory bus (MB), which indicates whether the message is being input or output, by multiplexer 243; and the new byte count is incremented as required by the counter 253 and is input back into the ICC RAM by bus 370. Similarly, the last bit count LBC is incremented by register 254 and returned to the ICC RAM by bus 380.

FIG. 4 is a block diagram of the CPU interface 101. The CPU interface contains two busses. The first bus 401 provides an interface with the CPU control to conduct control messages from the CPU into the ICC. The second bus provides an interface with the CPU memory to pass the actual messages and "traffic management" signals back and forth between the ICC RAM and the CPU memory.

The message data and associated BALE information enters the CPU memory interface 410 via multiplexer 421. Multiplexer 421 has four input terminals C, D, E and F which are connected as follows:

Terminal F receives all the labeled messages from the registers three and four 329 and 330;
terminal E receives all labeled messages from registers one and two 327 and 328; and
Terminals C and D receive all labeled outputs from the 32 bit CRC register 326.

As mentioned above, with each memory transfer, two bytes of data are exchanged, and the byte count is reduced by two. If the byte count reaches zero before the frame is completed, a Bale Pointer (BP) is incremented and a second BALE is read. The BP is sent from the CPU register 326 through multiplexer 420 into the CPU memory interface 410.

When second data block is started, the memory address and block size are maintained as in the first block. The process continues until a Flag character or an ABORT sequence is detected. This indicates completion of the frame. As many as 8 BALES (and therefore buffers) can be linked together to store a single frame of information. This does not imply that the same 8 memory buffers are always used for a channel as a BALE can contain any buffer starting address. It is true that a channel will sequence through the same 8 designated memory BALE locations to find where its next assigned buffer begins and now large it is. All buffers except the last one of a frame must be an even number of bytes long.

A Bale is written into memory at frame completion providing a Last Block Indicator and the block size remainder. The block size remainder is the byte count reduced by one for each data byte received and stored (CRC characters not included).

A Termination Entry is also written into the CPU memory at frame completion by multiplexer 420.

The CPU control interface 401 serves to conduct two control signals, Channel Memory Write (CMW), and execute (EX) into the ICC and conducts an interrupt (INT) signal from the ICC into the CPU. A termination is written into the CPU memory at every frame completion. Simultaneously an interrupt is generated by the flip flop 405 which feeds the INT signal into the CPU control interface 401 to inform the CPU that a received frame requires processing. The INT flip flop 405 is set by a signal from the conditions unit (CND) 406 which contains the ACT bit of the Bale word. The ACT bits function is described below is the discussion relating to ICC output operation.

ICC operational status is determined by an On/Off indicator (ICCON) 403. The state of this indicator is under CPU control through a control signal which enters the decoder 402. Normal channel service proceeds when the indicator is On. An On-to-Off indicator transition will cause the ICC to become nonfunctioning but it will complete the current channel service period. The ICC remains Off until the indicator is altered by the CPU.

The CPU can gain access to the ICC channel RAM by setting the ICC channel RAM Read/Write indicator bit 404. This indicator is enabled only when the ICC is Off. As a function of the bit being set, the ICC accessed a fixed half word location in memory to extract the channel RAM address and the operation request (Read or Write). The ICC than transfers a half word of data to or from the next half word location in memory depending on whether a read or write operation was specified.

The initiation of the output of a message from the ICC to the channel buffer can be started by either the CPU or a channel requesting a message. Inactive channels are listed once every n scans (n=a programmable number) to see if, during the time slot alloted to that channel, the ACT bit was reset. When the ACT bit is found to be reset, a new message has been queued for transmission.

When an output channel is not active, the bit byte count (BYC) in the transmit BYC location of the ICC channel word serves as an elapsed time counter. Each time the channel is scanned the count is downcounted. When the count reaches zero, the ACT bit in that channel BALE is accessed If the ACT bit is set, the channel is still inactive. The zero count is then replaced by a byte count location in the same BALE as the ACT bit.

In this way inactive channels are tested only once every n scans. (n=a programmable number) If, however, the ACT bit in the CND 406 tested is found to be reset, a new message has been queued for transmission on the channel and the channel is now active. The total BALE information is now transferred into the ICC RAM location for that channel. The BALE information of an activated channel, includes the block starting address (on a word boundary), a Last Block Indicator bit, and the block byte count. The block byte count now occupies the transmit BYC location and serves to keep track of bytes transmitted so that the ICC can determine when the buffer has emptied and when the frame transmission has been completed. The ACT is then set by the ICC.

The ICC reads data from memory for transfer to the Device Port by transferring both the data and BALE information from the CPU memory interface 410 in the WD (write data) signal into the memory bus 340 back through the four multiplexers 321-324 into the ICC RAM where the labeled signals are output out the registers 326-330 into the multiplexer 200 of the ICC process units 104.

The ICC reads the data from the ICC RAM to the Device Port interface 102 through the path described below. From multiplexer 200 and the INSR 201 a cyclic redundancy check is run by CRC 210. The bit stuffing unit 202 returns stuffed bits and the OUTSR 203 and output register 204 sends the channel address and transmit data to the device port interface.

Two data bytes are read each time the memory is accessed. With each transfer the byte count is reduced by two and the memory halfword address is incremented by one by counter 253. At the completion of the first data block, the Last Block Indicator in the BALE is checked. If it is not set, the BALE counter is incremented and a second BALE access is made. A second block is started and data continues to be read. New blocks will continue to be accessed until one is encountered which contains a Last Blockn Indicator. When this block is completed, the CRC characters are appended to the transmitted message prior to bit stuffing. At least two Flag characters will also be transmitted. A new message may start at this time, but if none are available the Device Port will be provided with Flag characters. It should be noted that all buffers except the last one of a frame must contain an even number of bytes. Also as many as 8 BALES per output channel may be linked to form a single frame. The ICC informs the CPU of the completion of frame transmission by writing a termination entry into the cpu memory through multiplexer 420 and raising an interrupt through the INT flip flop 405.

The ICC will service up to 16 full duplex channels. It utilizes a scan table that will accommodate any mix of channel speeds. Span sequence can be modified under program control.

Channel servicing in the ICC is provided during a channel service period. During this period, the transmit and receive lines of a full duplex channel are serviced. All data exchanges during a period are related to the particular channel being serviced. The channel service sequence or scan pattern is programmable and depends upon the number of channels and their speed. Command indicators are used by the CPU to initiate ICC operations.

Line procedure conform with Proposed American National Standard for Advanced Data Communication Control Procedures (ADCCP). The ICC will for each channel: generate/detect ABORT sequence and Flag character; generate/check CRC sequence; and will insert/delete stuffed zero bits.

With regard to the ICC data format, a frame may be composed of one or more data blocks. The last data block in a frame is recognized by inspecting the Last Nlock Indicator bit in the respective BALE.

Data block size is not fized. It may be any number of half words but cannot exceed 128 (256 bytes). The Bale contains a byte count filed which is used to indicate data block size. Block size is established by program control. Error detection is provided by cyclic redundancy check (CRC) technique. The Generator polynominal P (X) is hard-wire programmable and at present has been set to $X^{32}+X^{26}+X^{23}+X^{22}+X^{16}+X^{12}+X^{11}+X^{10}+X^8+X^7+X^5+X^4+X^2+X+1$. This is a CRC character length of 4 bytes, or 32 bits.

Operation of the ICC with the telecommunications system CPU is as follows:

Initialization is required after the ICC is powered up. The CPU must provide a procedure which loads correct initial information for each channel into the ICC channel RAM memory. The contents of channel memory for each simplex channel is tabulated below in Table I.

| | |
|---|---|
| CRC Word | 32 bits |
| Data Address | 16 |
| Data Store (3 bytes) | 24 |
| X-Reg | 8 |
| X bit count | 4 |
| Bale Register | 3 |
| Channel Mode | 1 |
| Memory Process State | 5 |
| First Block Indicator | 1 |
| Control bit Count | 3 |
| Reg Status Indicator | 3 |
| Character Process State | 3 |
| Packet Errors | 5 |
| Bale Pointer | 3 |
| Last Block Indicator | 1 |
| Byte Count | 8 |
| Last bit Count | 3 |
| Good CRC | 1 |
| Next Channel Adr./Aux. | 4 |
| Byte Count | |
| | 128 bits |

Data exchange with the ICC channel RAM is accomplished by memory steal cycles. The CPU places in a fixed fullword location in memory, the channel RAM address, a halfword of data, and a write request indication. The ICC uses this information to perform the requested operation. The format of this fullword is shown below.

TABLE I

| CHANNEL MEMORY CONFIGURATION FIELD DESIGNATION | | | | | | | | |
|---|---|---|---|---|---|---|---|---|
| Bit | 000 | 001 | 010 | 011 | 100 | 101 | 110 | 111 |
| 1 | BR0 | BYC 0 | LBI | DAD 0 | XR 1 | R2 1 | CRC O | CRC 16 |
| 2 | 1 | 1 | BPO | 1 | 2 | 2 | 1 | 17 |
| 3 | 2 | 2 | 1 | 2 | 3 | 3 | 2 | 18 |
| 4 | MPS 1 | 3 | 2 | 3 | 4 | 4 | 3 | 19 |
| 5 | 2 | 4 | FBK | 4 | 5 | 5 | 4 | 20 |
| 6 | 3 | 5 | RSI 1 | 5 | 6 | 6 | 5 | 21 |
| 7 | 4 | 6 | 2 | 6 | 7 | 7 | 6 | 22 |
| 8 | 5 | 7 | 3 | 7 | 8 | 8 | 7 | 23 |

TABLE I-continued

CHANNEL MEMORY CONFIGURATION FIELD DESIGNATION

| 9  | PE 1 (MAE) | NCA/ABYC 1 | CM      |   | 8  | R3 1 | R1 1 |   | 8  | 24 |
|----|------------|------------|---------|---|----|------|------|---|----|----|
|    | 2          |            |         |   |    |      |      |   |    |    |
| 10 | (BHR)      | 2          | CBC     | O |  9 | 2    | 2    |   | 9  | 25 |
| 11 | 3          | 3          |         | 1 | 10 | 3    | 3    |   | 10 | 26 |
|    | (B CRC)    |            |         |   |    |      |      |   |    |    |
| 12 | 4          |            |         |   |    |      |      |   |    |    |
|    | (SH MSG)   | 4          |         | 2 | 11 | 4    | 4    |   | 11 | 27 |
| 13 | 5          |            |         |   |    |      |      |   |    |    |
|    | (ABT MSG)  | CPS 1      | XBC     | O | 12 | 5    | 5    |   | 12 | 28 |
| 14 | LBC O      | 2          |         | 1 | 13 | 6    | 6    |   | 13 | 29 |
| 15 | 1          | 3          |         | 2 | 14 | 7    | 7    |   | 14 | 30 |
| 16 | 2          | GCRC       |         | 3 | 15 | 8    | 8    |   | 15 | 31 |
|    |            | SECTION A  |         |   |    | SECTION B |   |   |    |    |

Memory Location Address: (1FA00)₁₆

Fullword Data Format:

1st HW: R/W O O C C C C T/R O O O O O F F F
2nd HW: (Two bytes of data or two bytes of data storage)
where, R/W is the Read/Write Indicator bit.

Read is indicated by a one.

CCCC is the channel address. Range of values are 0–F.

T/R indicates either the transmit or receive section of channel CCCC. Receive is indicated by a zero.

FFF is the field or segment of the receive or transmit section under read/write consideration. Range of values are 0–7 (hexadecimal).

The CPU can initialize 16 full duplex channels. Each duplex channel contains 256 bits of RAM storage in which 128 bits are allocated to each of the receive and transmit sections of one channel. Since the CPU can only transfer one halfword of data at a time, 16 such transfers are required to load the channel RAM per duplex channel. An entire channel RAM load encompasses 256 CPU initiated transfers.

Proper ICC initialization requires that the transmit section of the in-service channels contain flag [(7E)₁₆] the X-Register location and the appropriate NCA value in the NCA/ABYC location of channel memory. The remaining channel memory bits should be initialized to zero.

Channel scanning in the ICC is designed to accommodate different data rate on different data duplex channels.

The NCA or Next-Channel Address value determines the channel scan sequence.

The channel scan sequence is developed such that every participating channel is serviced in a sufficient amount of time so that no overun condition is experienced.

The mechanics of establishing a scan sequence is illustrated by the examples given below.

Certain ICC hardware restrictions must be satisifed. They are,

1. Channel 0 must appear once in the primary scan cycle.

2. The primary scan cycle must be a linear sequence of the form 0 to X.

Examples of a primary scan sequence are: 0, 1, 2, 3; 0, 1, 2; 0, 1, 2, 3, 4, 5; etc. How this would be encoded in the NCA of the channels is shown below for the examples given.

|            |     | Example 2 |     |            |     |
|------------|-----|-----------|-----|------------|-----|
| Example 1  |     | Channel   |     | Example 3  |     |
| Channel No.| NCA | No.       | NCA | Channel No.| NCA |
| 0          | 3   | 0         | 2   | 0          | 5   |
| 1          | 0   | 1         | 0   | 1          | 0   |
| 2          | 0   | 2         | 0   | 2          | 0   |
| 3          | 0   |           |     | 3          | 0   |
|            |     |           |     | 4          | 0   |
|            |     |           |     | 5          | 0   |

Channel zero's NCA value is always the last channel of a given primary scan. All other ohannels of a primary scan always have the NCA value of channel zero.

In operation, examples 1, 2 and 3 will be processed as follows:

| Example 1 | 3 | 2 | 1 | 3 |   | etc. |      |
|-----------|---|---|---|---|---|------|------|
|           | 0 | 0 | 0 | 0 |   |      |      |
| Example 2 | 2 | 1 | 2 |   |   | etc. |      |
|           | 0 | 0 | 0 |   |   |      |      |
| Example 3 | 5 | 4 | 3 | 2 | 1 | 5    | etc. |
|           | 0 | 0 | 0 | 0 | 0 | 0    |      |

3. In the event that the primary scan will be the only scan, example 3 can be modified as follows:

| Channel No. | NCA |
|-------------|-----|
| 0           | 1   |
| 1           | 2   |
| 2           | 3   |
| 3           | 4   |
| 4           | 5   |
| 5           | 0   |

In operation, this would be processed as follows:

|   | 1 | 2 | 3 | 4 | 5 | 1 | 2 | etc. |
|---|---|---|---|---|---|---|---|------|
| 0 |   |   |   |   | 0 |   |   |      |

This type of scan dictates that all the channels present in the scan sequence have the same baud rate; if optimization is under consideration.

4. In the event that secondary scan sequences are required, a primary scan sequence of the type illustrated in item 2 above must be established.

A secondary scan sequence would be used if a mix of baud rates over the number of channels utilized in an operational system exists and optimization is desired. Such a sequence is illustrated below.

|  | Channel No. | NCA Value |
|---|---|---|
| PRIMARY | 0 | 3 |
|  | 1 | 8 |
|  | 2 | 8 |
|  | 3 | 8 |
| SECONDARY | 8 | 9 |
|  | 9 | A |
|  | A | B |
|  | B | C |
|  | C | D |
|  | D | 0 |

The NCA value of 8 replaces the value of 0 in the primary scan sequence. This is done in this example so that the secondary scan sequence is performed every time one of the primary scan channels are serviced. The secondary scan sequence always ends with the NCA value of 0, thus completing the initial primary scan requirement of having all channels return to zero.

In operation, the channels will be processed as follows:

|  | 3 | 2 | 1 | 3 |  |
|---|---|---|---|---|---|
|  | 8 | 8 | 8 | 8 |  |
|  | 9 | 9 | 9 | 9 |  |
|  | A | A | A | A |  |
|  | B | B | B | B |  |
|  | C | C | C | C | PRIMARY |
| SECONDARY | D | D | D | D | SCAN |
| SCANS | 0 | 0 | 0 | 0 |  |

This completes the discussion on the form that a scan sequence can take and the mechanics of encoding the NCA values.

In order to determine the exact pattern a scan sequence can take, the baud rates of the individual channels must be taken into consideration.

The ICC requires a duration of 4 usecs per byte per simplex channel for processing. Since the smallest processing operation is a duplex channel (receive and transmit sections) 8 usecs must be allotted. In this time, a receive as well as a transmit byte may be processed.

Given the processing time of 8 usec: per duplex channel and the required baud rates that must be sustained on each channel, a scan sequence is developed to meet all the criteria.

GIVEN:
3 channels at 32K baud for subscriber interface
7 channels at 80K baud for 6 trunks and 1 high speed channel subscriber.

(These are channel addresses 8, 9, A, B, C and D for the trunks and channel 0 for the high speed subscriber)

| DERIVED: | Channel Number | NCA Value |
|---|---|---|
| PRIMARY | 0 | 3 |
| SCAN | 1 | 8 |
|  | 2 | 8 |
|  | 3 | 8 |
| SECONDARY | 8 | 9 |
|  | 9 | A |

| -continued | | |
|---|---|---|
| DERIVED: | Channel Number | NCA Value |
|  | A | B |
|  | B | C |
|  | C | D |
|  | D | 0 |

Referring to Example 4 above, any given channel of the secondary scan and channel 0 is processed every eighth time. This is a time delay of 64 usec. Since a byte on any given secondary scan needs to be processed in 100 usec, a processing delay of 64 usec is satisfactory. Therefore, channels 8, 9, A, B, C, and D channel can be assigned to the 80K baud trunks.

In a similar fashion, the primary scan sequence can be analyzed. Here each channel excluding channel zero is processed every 24th time (see processing scan in Example 4 above). This works out to a time delay of 192 usec. The byte rate on any primary channel is 250 usec. (32K baud) Therefore, the 3 low speed subscribers will be channels 1, 2, and 3. Once again, more than enough time is allowed for processing.

Channel zero gets processed at the secondary scan rate. Therefore its baud rate can be similar to the secondary channel baud rate. Channel zero may be assigned to the high speed subscriber.

Each data block requires a Buffer Address List Entry (BALE). A BALE consists of two half words. The half words of a BALE contain the following information. (See FIG. 5)

| 1st BALE Halfword - | Act Bit | 1 bit |
|---|---|---|
|  | Last block indicator | 1 bit |
|  | Byte count | 8 bits |
|  | Bit count | 3 bits |
|  | Channel out of service | 1 bit |
|  | Spare | 2 bits |
| 2nd BALE Halfword - | Block start address | 16 bits |
|  | (Address is on a half word boundary.) | |
|  | (Buffer address capability is 64K half words.) | |

A channel can address 8 different BALES. The BALE address is composed as follows:

| Hardwired constant | 9 bits |
|---|---|
| Channel number | 5 bits |
| Bale pointer | 3 bits |
| Bale halfwords | 1 bit |

A Termination Queue Entry is written to memory after a message frame is transmitted or received. The Termination Queue Entry contains the following information. This is tabulated in the following Table II

| Channel Number | 5 bits |
|---|---|
| Last block Bale pointer | 2 bits |
| Errors | 5 bits |
| Spare | 3 bits |

Errors include ABORT (ABT), SHORT MESSAGE (SHMSHG), BAD CRC (BCRC), BUFFER NOT READY (BNR), MEMORY ACCESS ERROR (MAE).

The Termination Queue Entry address if composed as follows:

| | |
|---|---|
| Hardwired constant | 10 bits |
| Term queue entry pointer | 8 bits |
| Address Format 1 F 1 Ø 1 Term Queue Entry Pointer Ø hexadecimal | |

TABLE II
BALE AND TERMINATION ENTRY CONFIGURATIONS

| | BALE DATA | | |
|---|---|---|---|
| BIT | 2nd HW | 1st HW | TERM ENTRY |
| LSB  1 | BSA 1 | BYC 0 | CAD 1 |
| 2 | 2 | 1 | 2 |
| 3 | 3 | 2 | 3 |
| 4 | 4 | 3 | 4 |
| 5 | 5 | 4 | 5 |
| 6 | 6 | 5 | LBP 0 |
| 7 | 7 | 6 | 1 |
| 8 | 8 | 7 | 2 |
| 9 | 9 | BTC 0 | PE 1 |
| | | | (MAE) |
| 10 | 10 | 1 | 2 |
| | | | (BNR) |
| 11 | 11 | 2 | 3 |
| | | | (B CRC) |
| 12 | 12 | | 4 |
| | | | (SH MSG) |
| 13 | 13 | ACT | 5 |
| | | | (ABT MSG) |
| 14 | 14 | LBI | |
| 15 | 15 | COS | |
| 16 | 16 | | |
| 17 | — | — | — |
| MSB 18 | — | — | — |

A CPU interrupt will be generated after a Termination Queue Entry is written to memory.

Operation of the ICC with data memory is as follows:

All data and information exchanges between the ICC and CPU are provided by memory cycle steal or Direct Memory Access (DMA) procedures. When the ICC mode is ICCON, data exchanges are message data, BALES and Termination Queue Entries. When the mode is ICCOFF, data exchanges are ICC Channel RAM Field information.

Data storage capacity in the ICC is limited. In processing channel messages, a minimum number of half-word memory accesses must be available or data will be lost.

The ICC can have as many as 1 cycle steal every 4 usec. for data transfers and will average 1 cycle steal every 8 usec. for data even when it is fully loaded. From the time the ICC raises a Memory Break Request it must receive a memory cycle within 2.5 usec. or data will be lost.

Figure 5:
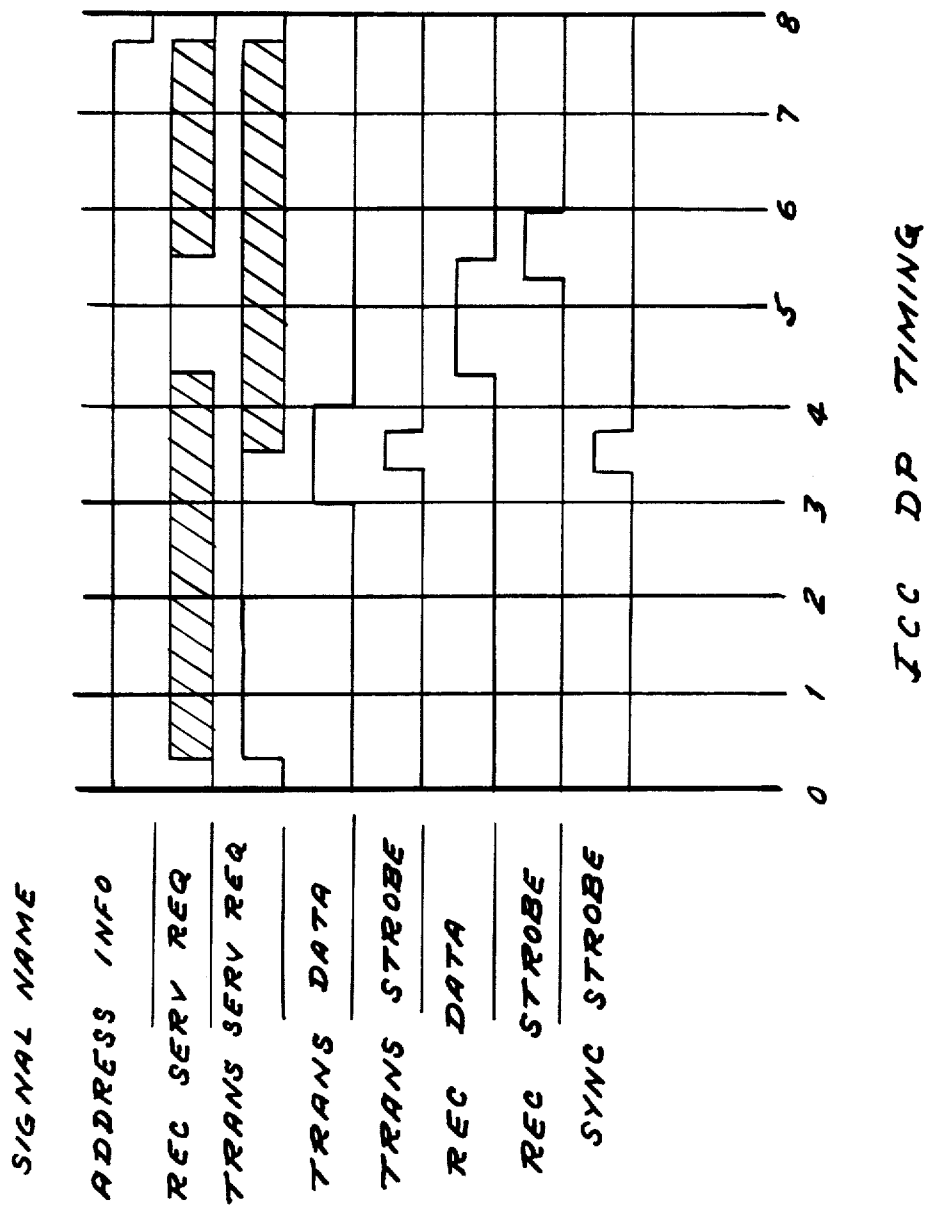
FIGS. 5 illustrates the interactive communications channel device port timing waveforms.

The following represents interfacing between the ICC and device ports (DP). ICC-DP timing waveforms are illustrated by FIG. 5. Signal identification and signal levels are as follows:

| Signal Identification | | |
|---|---|---|
| | Number of Lines | Signal Sources |
| Signal Name | | |
| Address Information | 4 | ICC |
| Receive Service Request | 1 | DP |
| Transmit Service Request | 1 | DP |
| Transmit Data | 8 | ICC |
| Transmit Strobe | 1 | ICC |
| Receive Data | 8 | DP |
| Receive Strobe | 1 | ICC |
| Signal Levels | | |
| Logical 0, +5 V | | |
| Logical 1, 0 V | | |
| Twisted pair lines | | |
| Receiver termination, 1k ohm to +5 V | | |

The signal identification and signal levels for CPU are:

| Signal Identification | | |
|---|---|---|
| | Number of Lines | Signal Source |
| Signal Name | | |
| Indicators | | |
| Indicator Lines | 2 | CPU |
| Control Lines | 1 | CPU |
| Indicator Settings | 2 | ICC |
| Interrupt | 1 | ICC |
| Signal Levels | | |
| Logical 0, +5 V | | |
| Logical 1, 0 V | | |
| Twisted pair lines | | |
| Receiver Termination, 1K ohm to +5 V | | |

Control signals between ICC and CPU are asynchronous. Except for the ICC On/Off signal, control signals are enabled for the state of the ICC On/Off indicator shown. Pulse width, ½ us to 1 us.

ICC On/Off—No conditions

Channel RAM Access—ICC Off

Interrupt—ICC On

Figure 6:
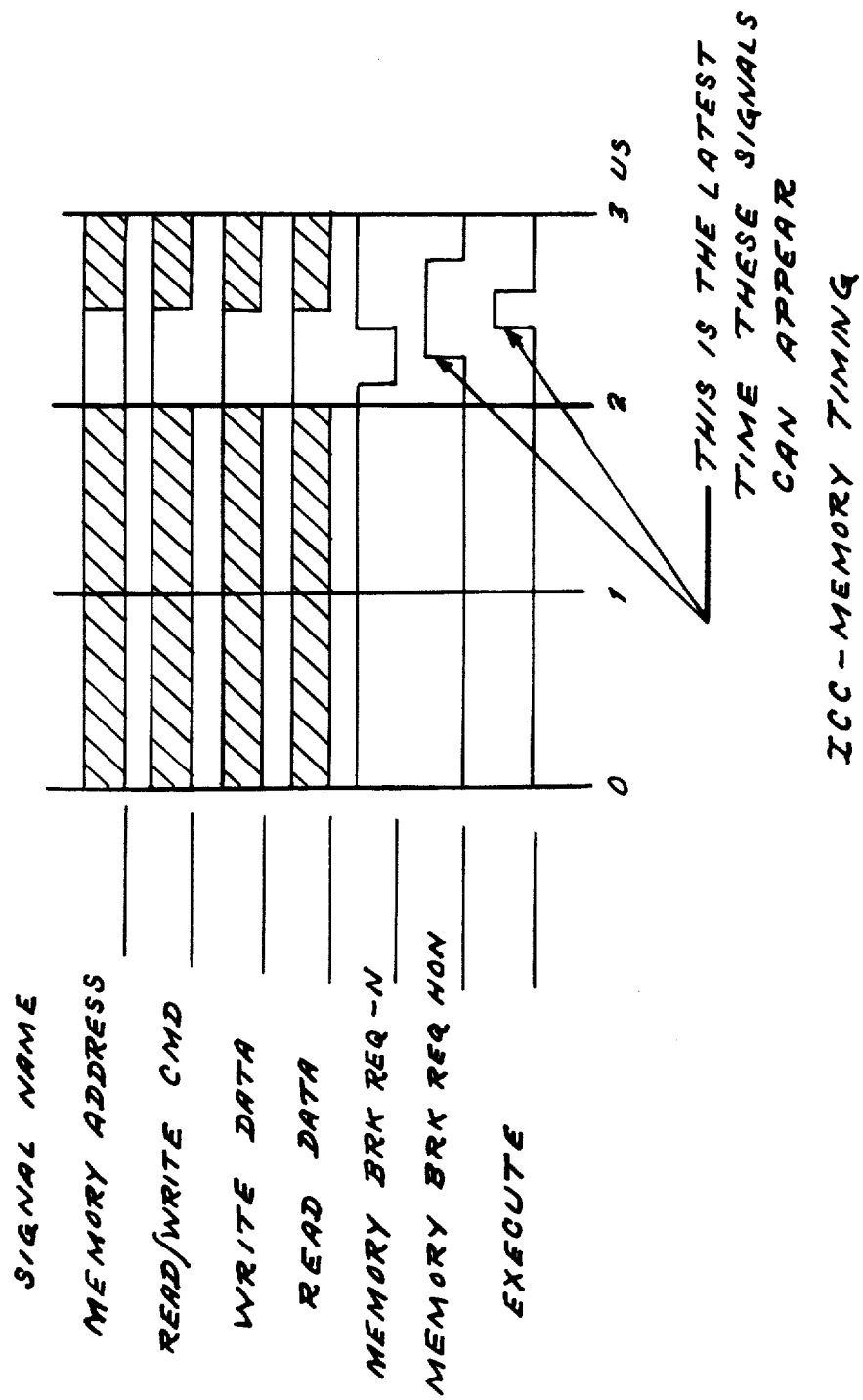
FIG. 6 illustrates the interactive communications channel memory timing waveforms.

The following represents signal identification and signal levels for the ICC memory. Memory timing waveforms are shown in FIG. 6.

| Signal Identification | | |
|---|---|---|
| | Number of Lines | Signal Source |
| Signal Name | | |
| Memory Address | 18 | ICC |
| Memory Break Request | 1 | ICC |
| Read/Write Command | 1 | ICC |
| Write Data | 16 | ICC |
| Read Data | 16 | Memory |
| Memory Break Req. Honor | 1 | Memory |
| Execute | 1 | Memory |
| Signal Levels | | |
| Logical 0, +5 V | | |
| Logical 1, 0 V | | |
| Twisted pair lines | | |
| Receiver termination, 1K ohm to +5 V | | |

The ICC includes a display panel the layout of which is shown in tabular form in the following Table III. The panel provides a means to perform initial ICC checkout and maintenance. A group of toggle switches provide memory read data and latches with LED indicators provide a means to observe memory write data. The following operational modes are available and each may be made on one of three possible timing modes. The operational modes are: Single Channel—The device address does not change for repeated channel service periods; and, Multichannel—The channel buffer address changes based upon the scan table. The timing modes are: Single Pulse—Timing periods are advanced by pushbutton depressions; Single channel service period—The channel service period occurs once for each push button depression; and, Continuous channel service period—The channel service period occurs at the normal rate.

Three additional features are provided by the ICC panel. Display of time slots, display of channel RAM by fields and display of operational data and registers.

1. Time slots—16 time slots and transmit/receive bit.
2. Channel memory—16 bits of selected RAM field.
3. Operation data and registers—2 groups of information can be displayed. See FIG. 5 for displayed data.

TABLE III

| BITS | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|
| ICC PANEL DISPLAY | | | | | | | | | | | | | | | | | | |
| TIME SLOTS | — | T/R | T  | T  | T  | T  | T  | T  | T  | T | T | T | T | T | T | T | T | T |
|  |  |  | S  | S  | S  | S  | S  | S  | S  | S | S | S | S | S | S | S | S | S |
|  |  |  | 16 | 15 | 14 | 13 | 12 | 11 | 10 | 9 | 8 | 7 | 6 | 5 | 4 | 3 | 2 | 1 |
| CHANNEL | — | — | B  | B  | B  | B  | B  | B  | B  | B | B | B | B | B | B | B | B | B |
| MEMORY |  |  | I  | I  | I  | I  | I  | I  | I  | I | I | I | I | I | I | I | I | I |
|  |  |  | T  | T  | T  | T  | T  | T  | T  | T | T | T | T | T | T | T | T | T |
|  |  |  | 16 | 15 | 14 | 13 | 12 | 11 | 10 | 9 | 8 | 7 | 6 | 5 | 4 | 3 | 2 | 1 |
| OPERATION | — | — | —  | —  | —  | X  | X  | X  | C  | C | C | F | M | M | M | M | M | L |
|  |  |  |    |    |    | B  | B  | B  | B  | B | B | B | P | P | P | P | P | B |
|  |  |  |    |    |    | C  | C  | C  | C  | C | C | K | S | S | S | S | S | I |
|  |  |  |    |    |    | 2  | 1  | 0  | 2  | 1 | 0 |   | 5 | 4 | 3 | 2 | 1 | 1 |
| REGISTERS | — | S3 | S2 | S1 | V0 | C  | C  | C  | A  | A | B | B | B | B | B | B | B | B |
|  |  |  |    |    |    | P  | P  | P  | B  | B | B | Y | Y | Y | Y | Y | Y | Y |
|  |  | =  | =  | =  | =  |    |    |    |    |   |   |   |   |   |   |   |   |   |
|  |  |  |    |    |    | S  | S  | S  | Y  | Y | C | C | C | C | C | C | C | C |
|  |  | 1  | 1  | 1  | 1  | 3  | 2  | 1  | C  | C | 7 | 6 | 5 | 4 | 3 | 2 | 1 | 0 |
|  |  |    |    |    |    |    |    |    | 1  | 0 |   |   |   |   |   |   |   |   |

The following is a glossary of terms and abbreviations used to describe ICC operations in the remainder of this document.

ABT: ABORT
ABYC: Auxiliary byte counter; used to count the first four characters of a data buffer for receive channels.
AFF: A Flip-Flop; used to address channel RAM
BNR: "Buffer Not Ready" Error Condition
BP: Bale Pointer
BR: Bale Register
BYC: Byte Counter; used for data buffer control. Decremented for each byte transferred.
CBC: Control Bit Counter; used to detect flag and abort characters, also for bit stuffing.
CBS: Channel Buffer System
CM: Channel Mode; ADCCP or other (e.g. ARPA)
CMAC: Channel Memory Access
CMO: Channel Memory Output
CMW: Channel Memory Write
CPS: Character Process State
CPU: Central Processing Unit
CRC: Cyclic Redundancy Check (Register)
DLE: "Delte" Character (ARPA)
DRC: DLE Received (ARPA)
DTAD: Data Address
ETX: "End of Text" Character (ARPA)
EX: Execute Signal from CPU or Memory
FBK: First Block of Buffer Area
FL: "Flag" Sequence
FLD: Field of Channel Memory
GCRC: Good Cyclic Redundancy Check
ICCON: Inter Communications Channel ON Indicator
INT: Interrupt
IR: Input Shift Register
LBC: Last Bit Count
LBI: Last Block Indicator
MAG: Memory Access Gate
MAE: Memory Access Error
MB: Memory Bus (Data from Core Stored in Register)
MBH: Memory Break Honored (from memory)
MBR: Memory Break Request (to memory)
MPS: Memory Process State
MS: Memory Sequence
NCA: Next Channel Address
NMP: Next Memory Process
OR: Output SHift Register
PE: Error Flags
PB: Panel Bus (Data from Panel)
R1: Data Registers (R2 or R3)
RD: Read Data From Memory (becomes MB)
RSI: Register Status Indicator
S1: Parts of RSI (S2 or S3)
SOS: Start of Scan
SR: Service Request from Device Port
STX: "Start of Text" Character (ARPA)
SYNC: "SYNC" Character (ARPA)
TP: Termination Queue Pointer
TE: Termination Entry
TSq: Time Slot
VO: Bit Being Shifted Out of Input Shift Register
WD: Write Data (Data to Memory)
XBC: X Bit Counter-used for data control. Receive—as the bits are shifted into OUTSR the XBC is incremented. When XBC=8 a character is complete and must be stored in channel memory. Transmit—as the bits are shifted out of the INSR the XBC is incremented. When XBC=8 a new character is required from channel memory.
XR: X Register, used to store a part of a byte for continued processing in next cycle.
YBC: Y Bit Counter, used for data control. Receive—as the bits are shifted out of the INSR the YBC is incremented. When YBC=8 all of the received bits have been processed. Transmit—as the bits are shifted into the OUTSR the YBC is incremented. When YBC=8 a character is ready to go to the character buffer.

The ICC hardware centers around the ICC Channel Memory. There are 256 fields of 16 bits in each field. Information in this memory is partitioned so that each simplex channel uses 8 fields in this Random Access Memory (RAM). Each time a device is scanned by the ICC, all the information for that channel is accessed from the memory and stored in a variety of registers, shift registers and counters. At the end of the 4 usecs dedicated to that device all the information is restored in the Channel Memory. If the device had required servicing, updated information is stored back in the memory. If the device did not require servicing, the old information will remain in the Channel Memory. The manipulation of this memory, registers, shift registers and counters to perform the required ICC functions and hereinafter described in detail.

Figure 7:
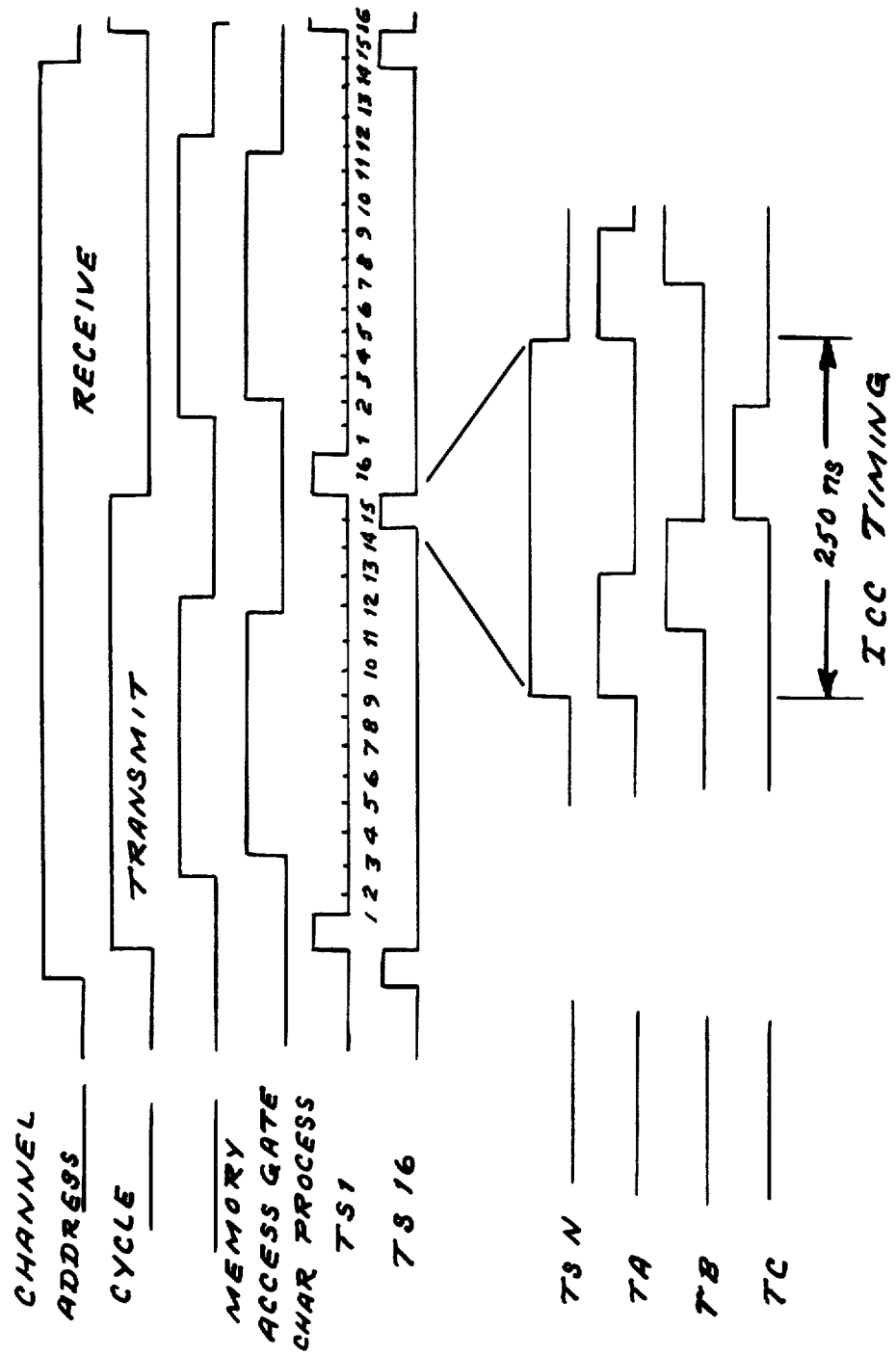
FIG. 7 illustrates the timing waveform for the interactive communications channel.
Figure 8:
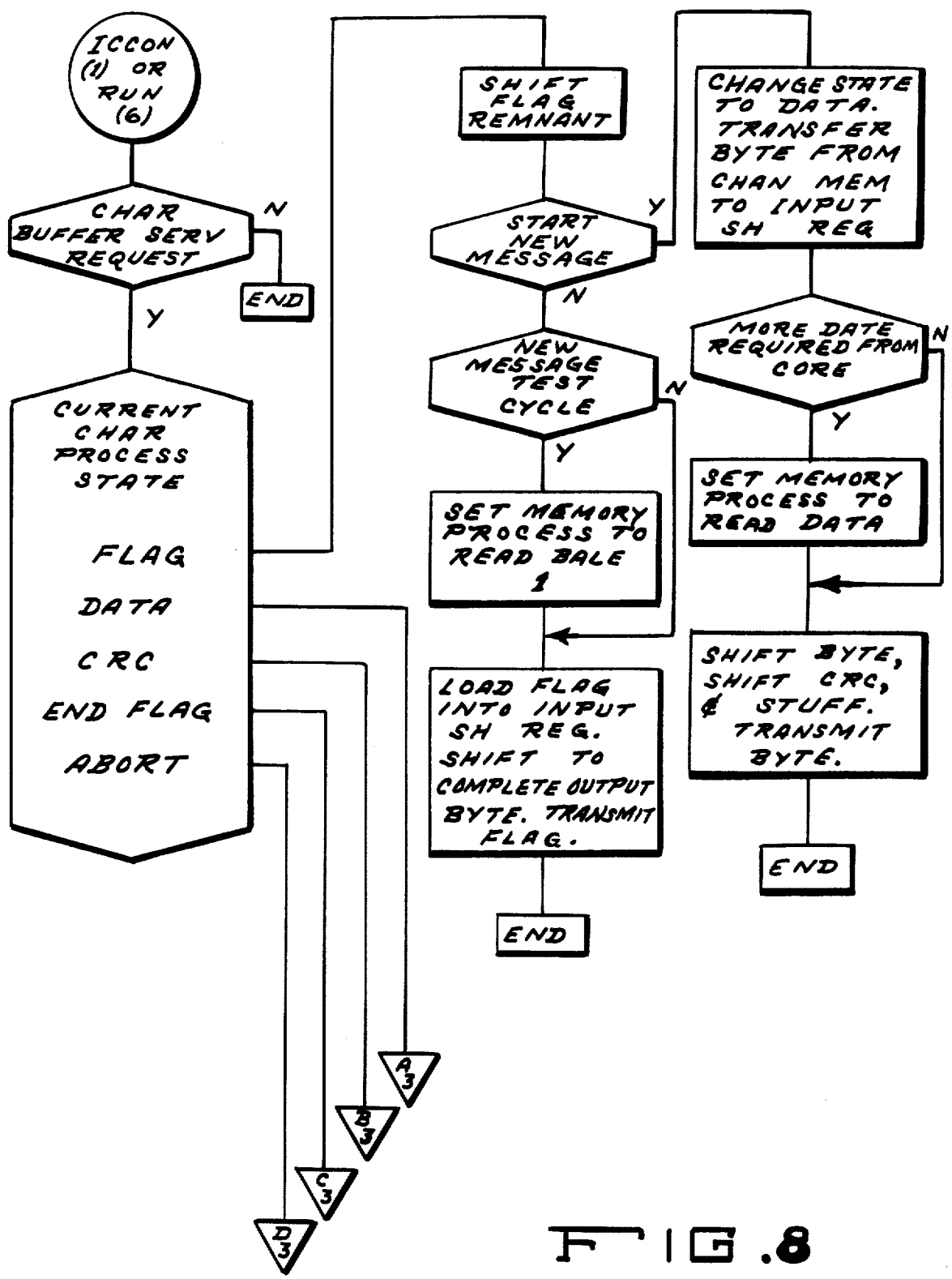
FIGS. 8 and 9 and 10 comprise the transmit memory process flowcharts of the interactive communications channel.
Figure 9:
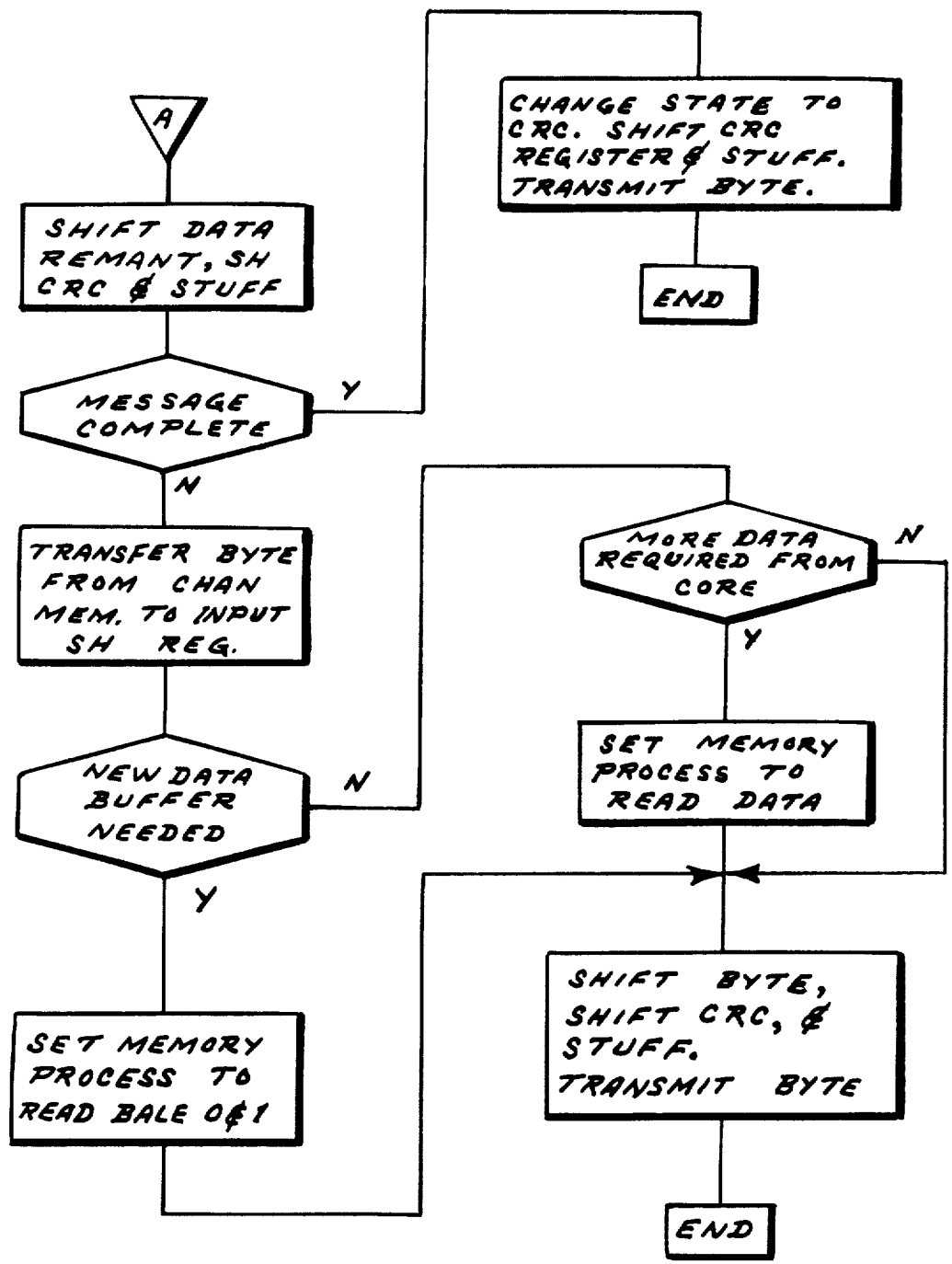
Figure 10:
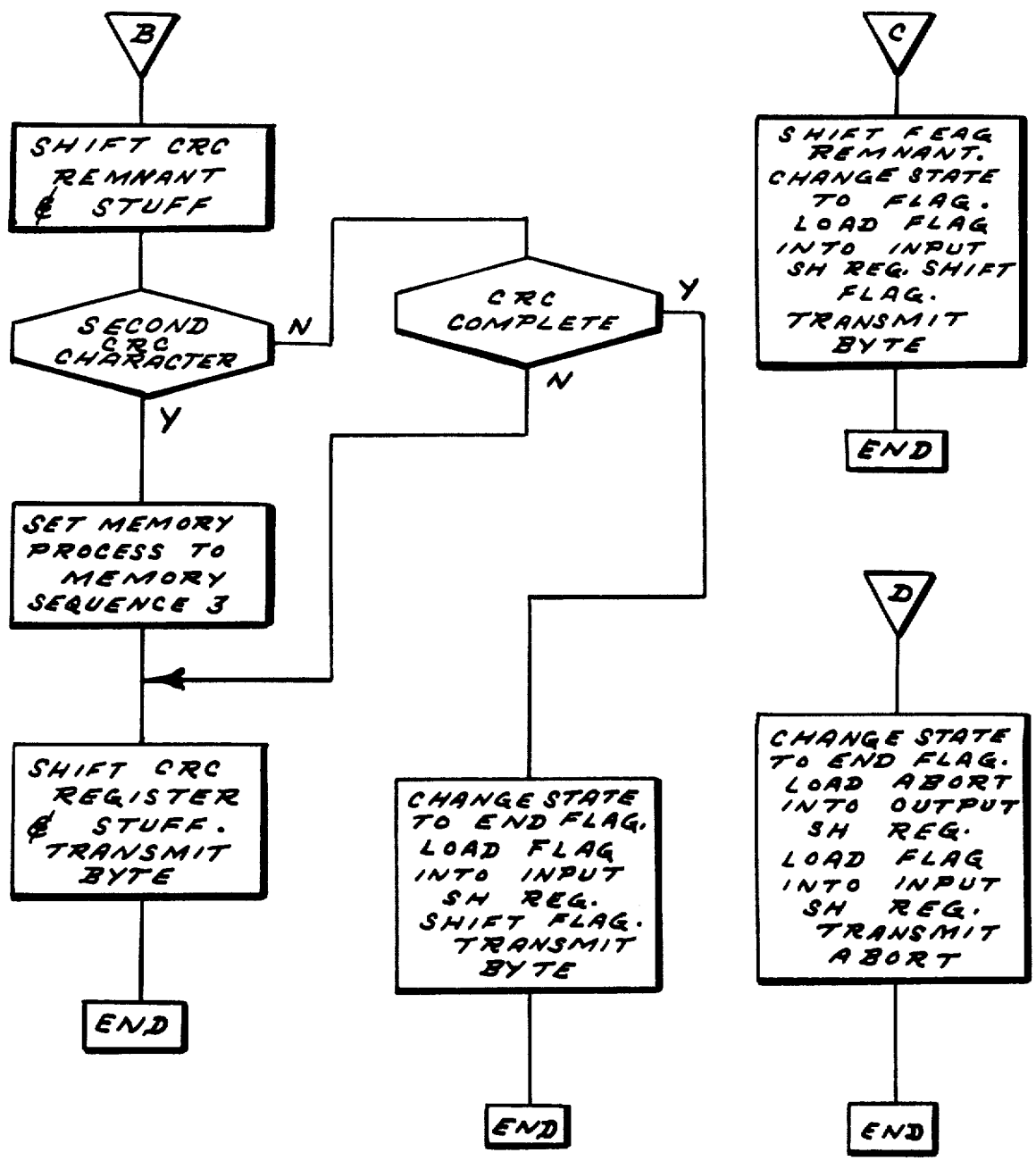
Figure 11:
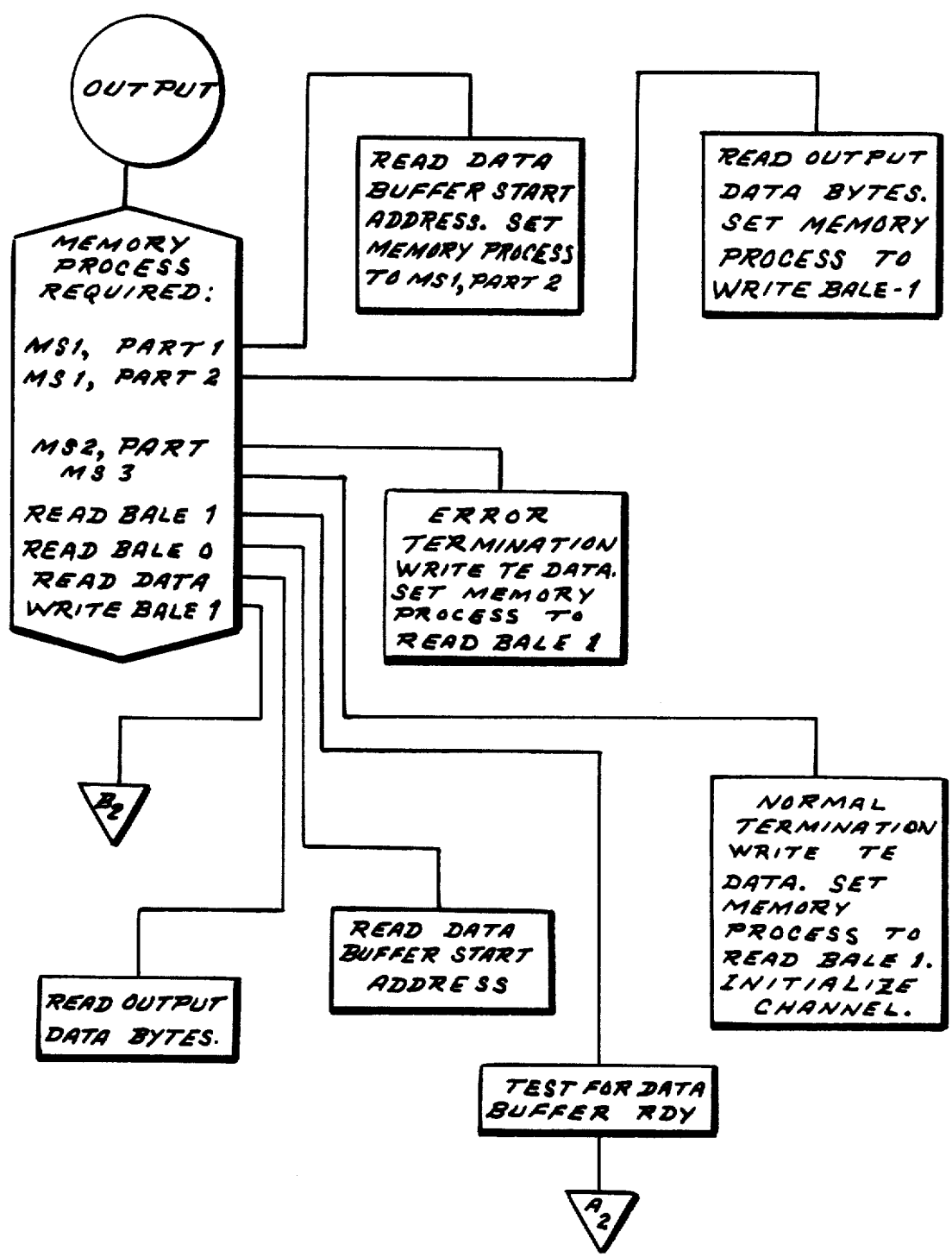
FIGS. 11 and 12 comprise the transmit memory process flowcharts of the interactive communications channel.
Figure 12:
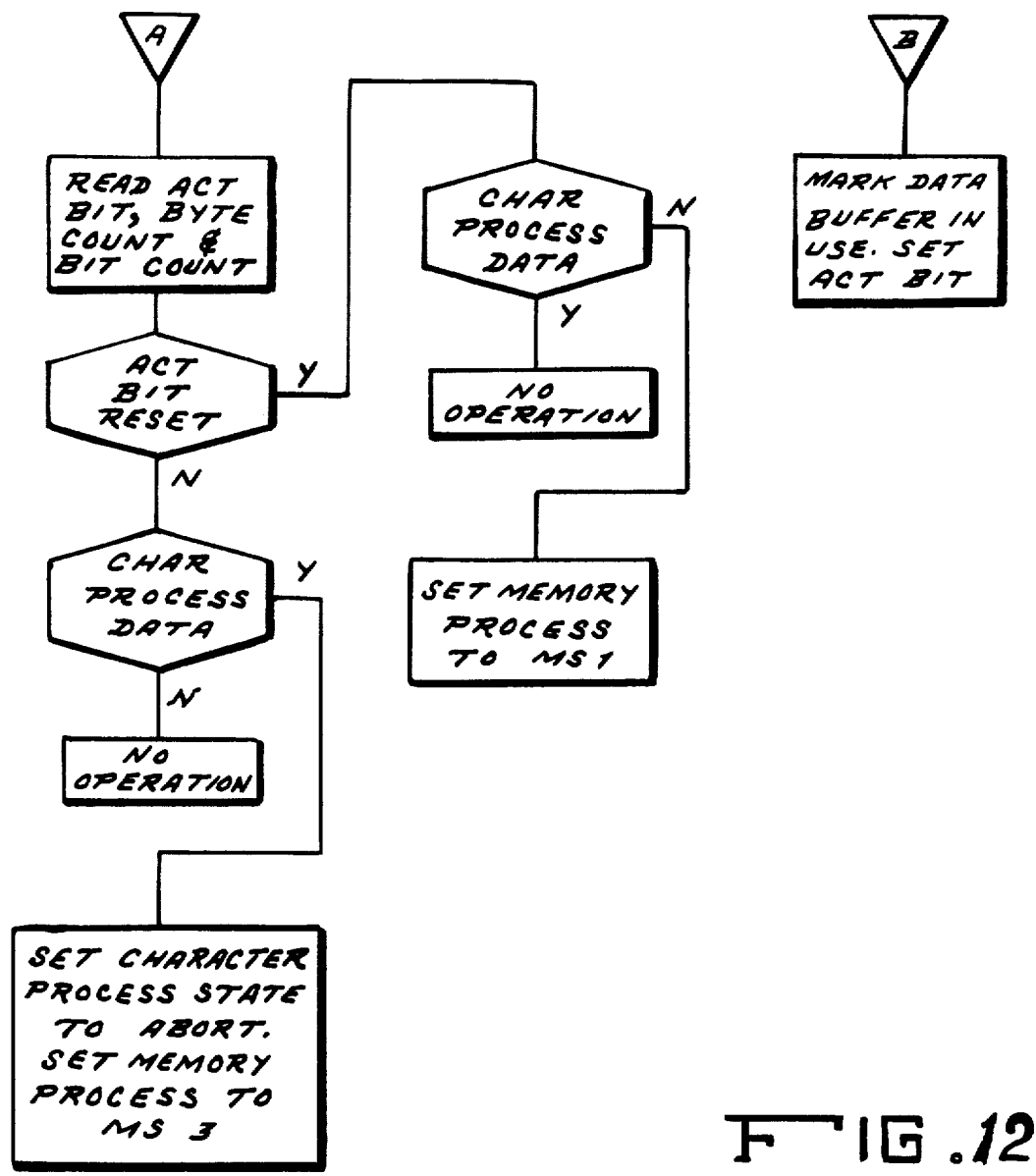
Figure 13:
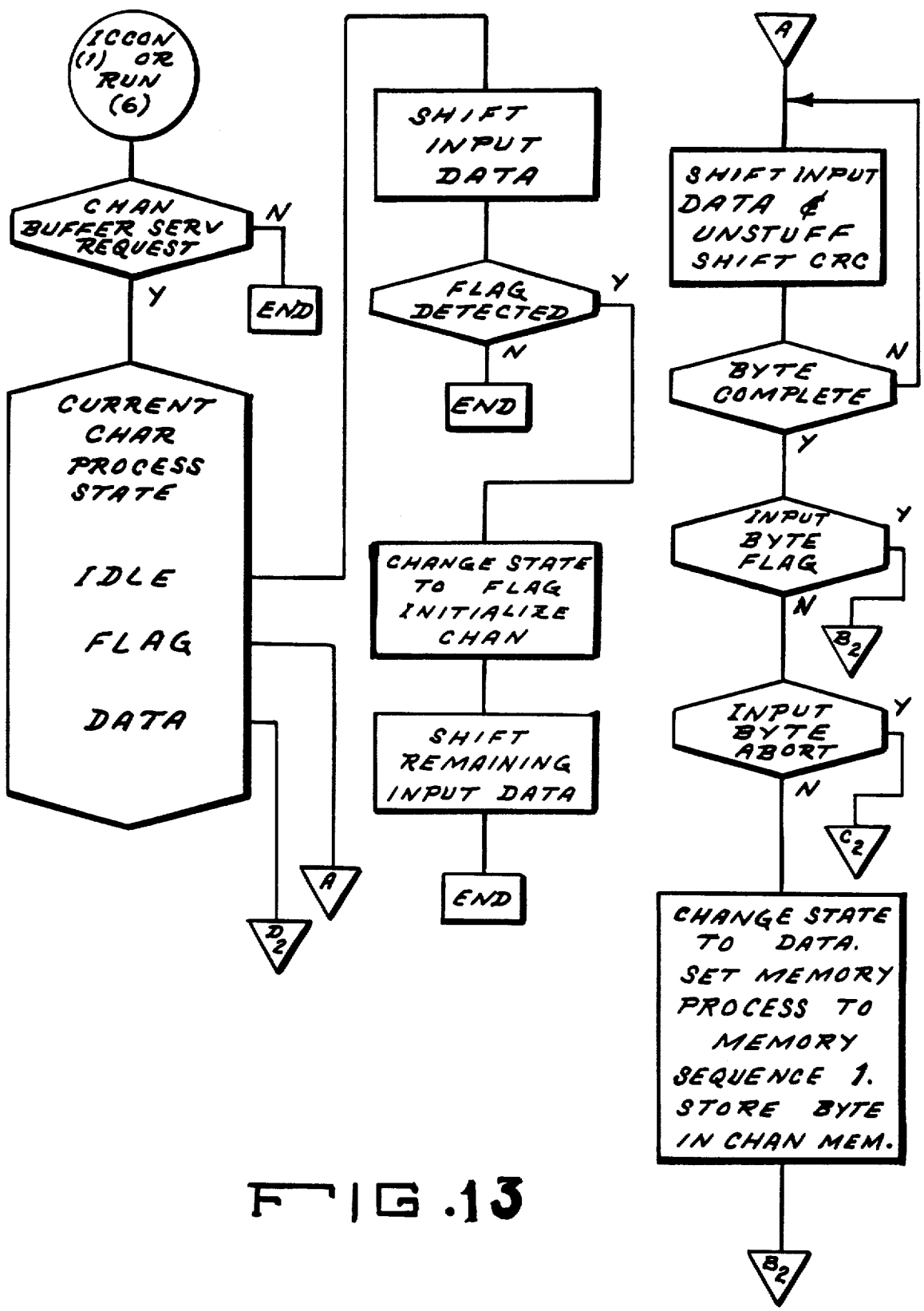
FIGS. 13 and 14 comprise the receive process flowcharts of the interactive communications channel.
Figure 14:
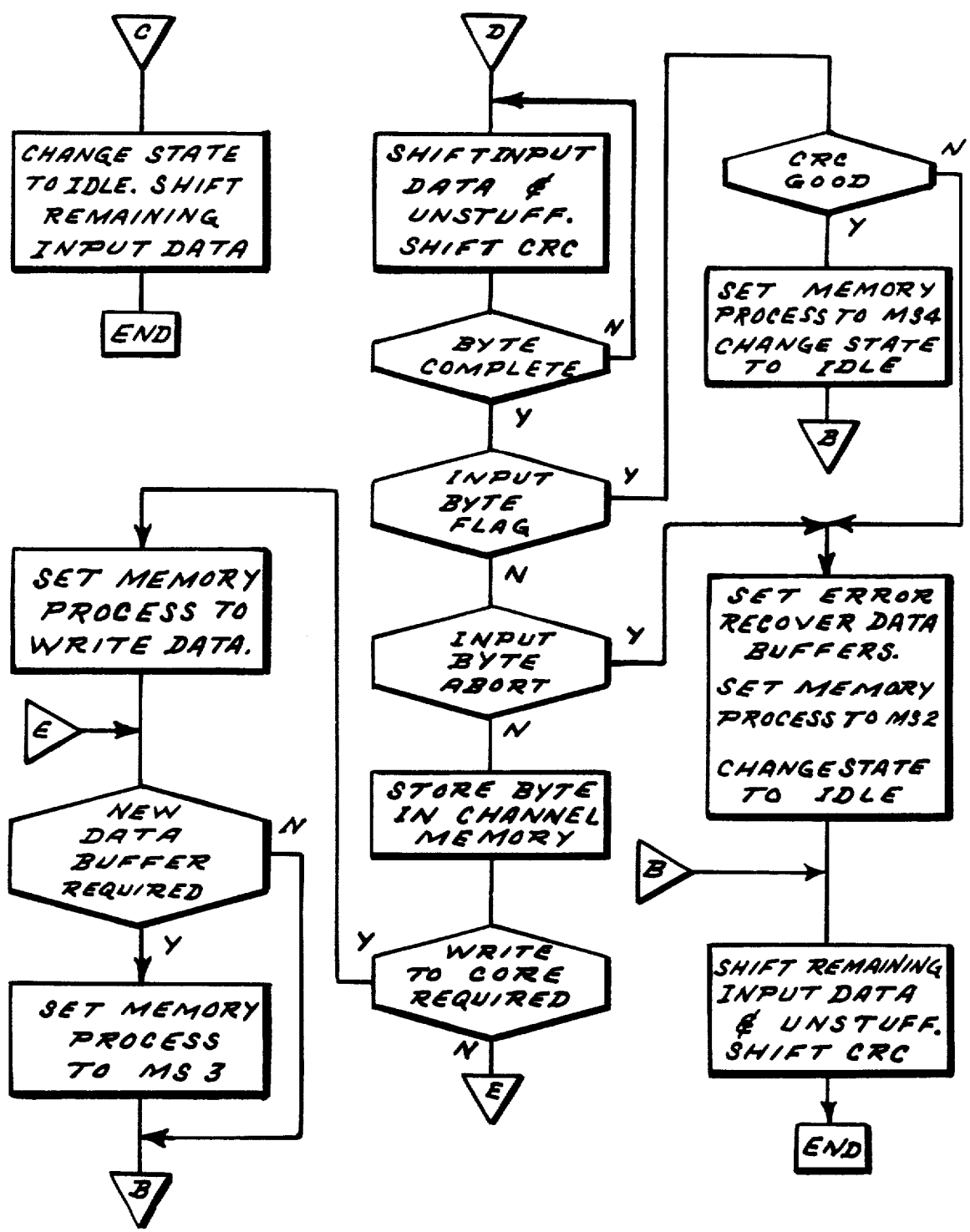
Figure 15:
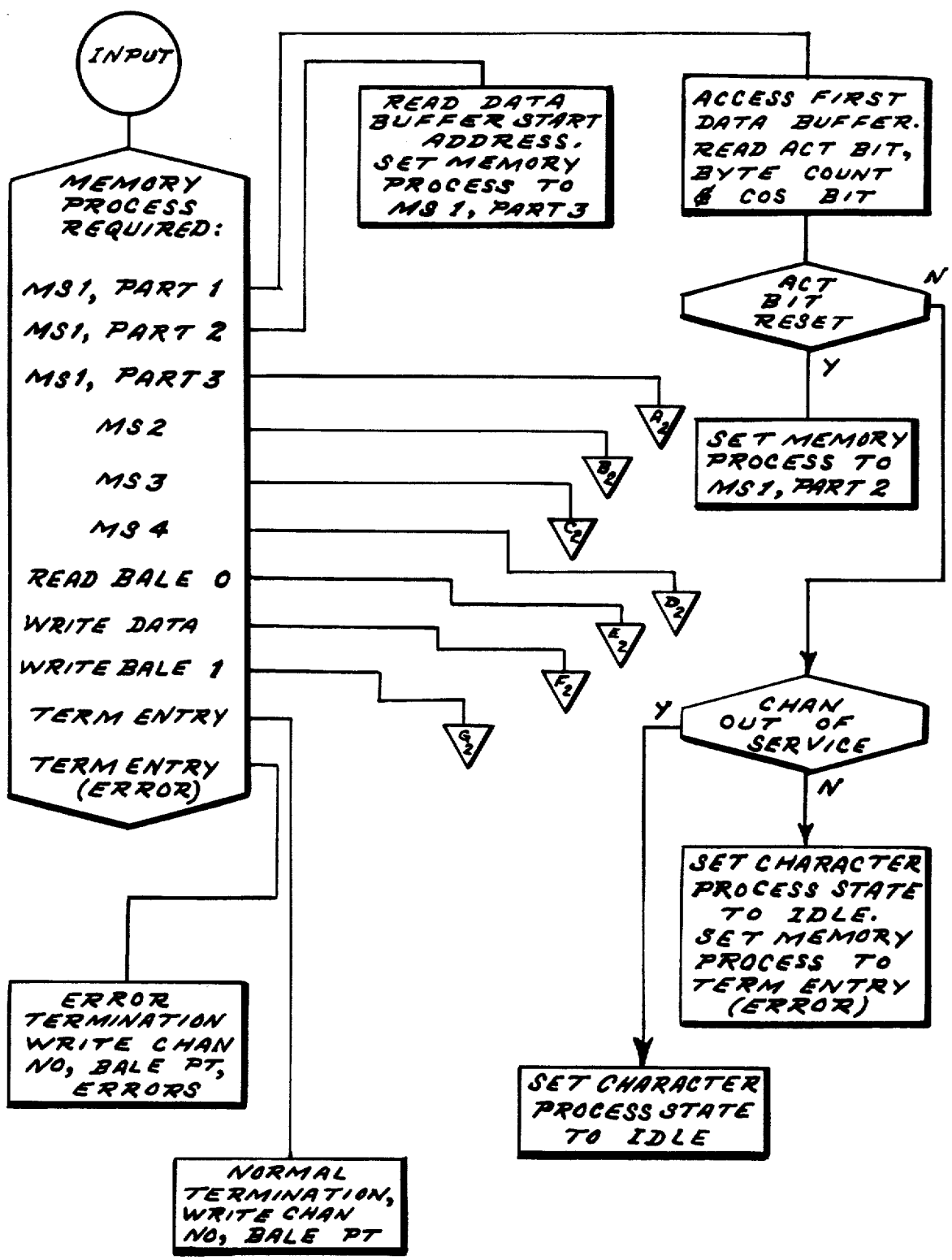
FIGS. 15 and 16 comprise the receive memory process flowcharts of the interactive communications channel.
Figure 16:
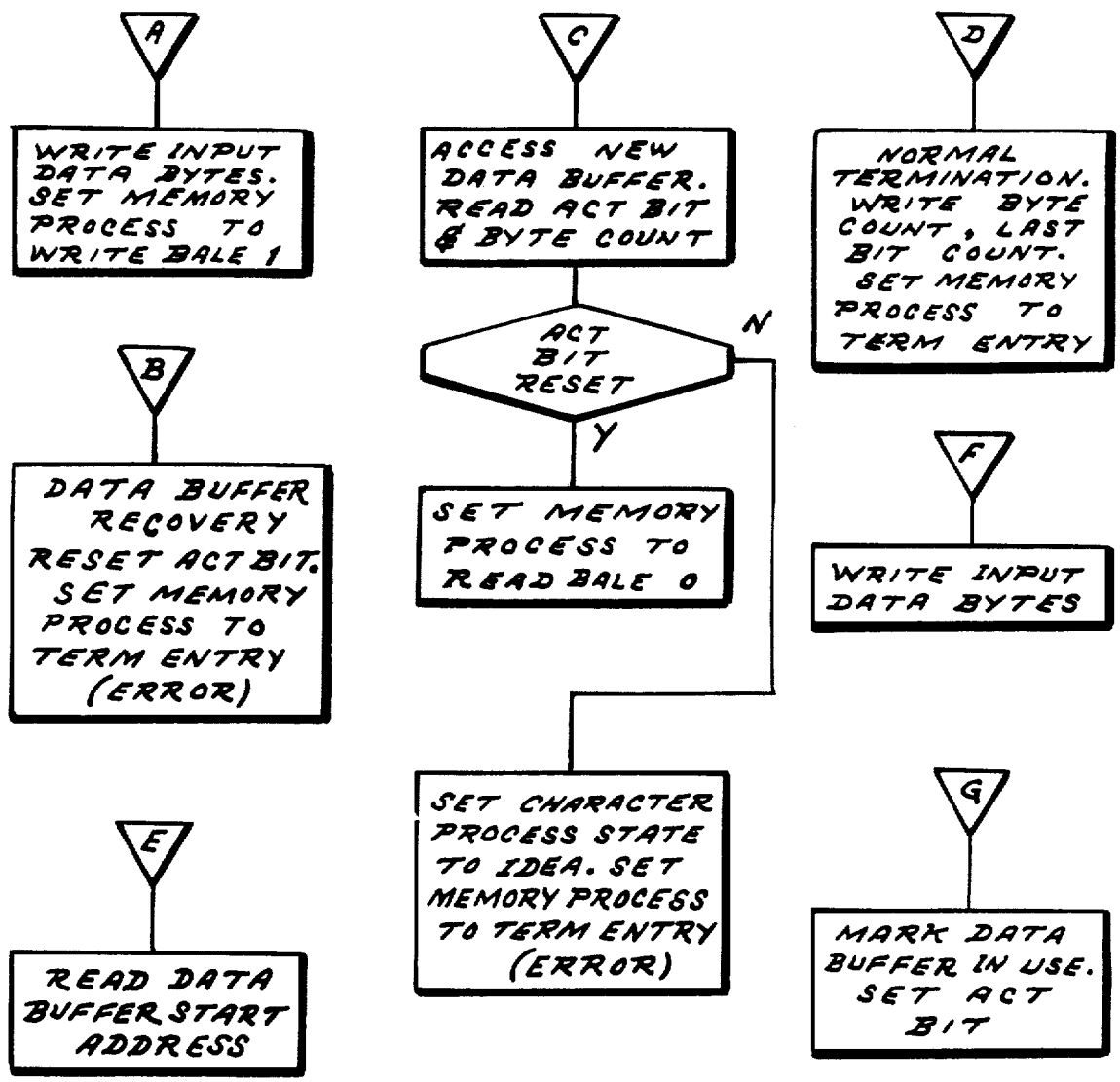

The ICC goes through 16 time slots per simplex device and services first a transmit device and then a receive device. Each time slot has a 250 nsec duration which is divided into 3 timing pulses. Therefore, 8 usecs is expended to service a full duplex device. FIG. 7 shows the ICC timing waveforms.

There are two processes that occur simultaneously within the ICC. One is character processing and the other is CPU memory processing.

For each simplex device there are 16 time slots to perform the necessary function. Seven of the 16 time slots (1, 2, 3, 3, 14, 15 and 16) have fixed functions. The other 9 time slots encompass 8 register shifts and 1 register store with the register shift occuring anywhere within the 9 time slots, since it is dependent on the data being received or transmitted. Table IV shows the General Operation Timing. In this table, it is noted that the channel memory word for simplex channel is divided into two parts, Section A and Section B as shown in Table 1. In Table IV, the abbreviations are as follows:

CPS—Character Process State
MPS—Memory Process State
NMP—Next Memory Process State It should be noted that the Character processing has an effect on the Memory Processing and vice versa.

TABLE IV

GENERAL OPERATION TIMING

| Time Slot | Service Period | RAM Access | |
|---|---|---|---|
| | | | Character Process Operation |
| 1 | Trans | Read A | Read A word from RAM, load registers. |
| 2 | | | Change RAM address to B section. |
| 3 | | Read B | Make CPS decision, Read B word from RAM |
| 4 | | | |
| 5 | | | |
| 6 | | | |
| 7 | | | Character Process |
| 8 | | | 8 shifts and 1 register load |
| 9 | | | Under control of sequence |
| 10 | | | Control Generator |
| 11 | | | (TS 4-12) |
| 12 | | | CPS sets next CPS & Initiates NMP |
| 13 | | | MPS modify next CPS & sets NMP |
| 14 | | Write B | Write B word to RAM |
| 15 | | | Change RAM address to A section |
| 16 | Trans | Write A | Write A word to RAM |
| 1 | Rec | Read A | Read A word from RAM, load registers |
| 2 | | | Change RAM address to B section |
| 3 | | Read B | Make CPS decision, Read B word from RAM |
| 4 | | | |
| 5 | | | Character Process |
| 6 | | | |
| 7 | | | 8 shifts and 1 register store |
| 8 | | | |
| 9 | | | Under control of sequence |
| 10 | | | Control Generator |
| 11 | | | (TS 4-12) |
| 12 | | | CPS sets next CPS & Initiates NMP |

TABLE IV-continued

GENERAL OPERATION TIMING

| Time Slot | Service Period | RAM Access | |
|---|---|---|---|
| 13 | | | MPS modify next CPS & sets NMP |
| 14 | | Write B | Write B word to RAM |
| 15 | | | Change RAM address to A section |
| 16 | Rec | Write A | Write A word to RAM, change Chan. Address |

Aside from ICC memory cycle steals to CPU core memory for transferring data, the ICC must access memory to read or write control information. The ICC must read from and write to the 1st halfword of a given BALE, read the 2nd halfword of the same BALE and write Termination Entries at the completion of a good or bad frame. The following is a list of memory accesses for control information when they occur and the functions performed during each state.

Transmit Cycle

A. Start of Buffer 1:
 1. Read BALE, 1st Hw—test ACT bit, store byte count and Last Block Indicator.
 2. Read BALE, 2nd Hw—store data buffer start address.
 3. Write BALE, 1st Hw—set ACT bit.
B. Start of Buffer N:
 1. Read BALE, 1st Hw—same as A1.
 2. Read BALE, 2nd Hw—same as A2.
C. End of Last Buffer (Normal):
 1. Write Term Entry—write channel no., BALE pointer of last buffer and errors.
 2. Read BALE, 1st Hw—test ACT bit of next BALE for possible start of new message.
D. End of Last Buffer (Error)
 1. Write Term Entry—write channel no., BALE pointer of first buffer, and errors.
 2. Read BALE, 1st Hw—same as A1.
A. Start of Buffer 1:
 1. Read BALE, 1st Hw—test ACT bit, test COS (Channel Out of Service) bit and store byte count.
 2. Read BALE, 2nd Hw—store data buffer start address.
 3. Write BALE, 1st Hw—set ACT bit.
B Start of Buffer N:
 1. Read BALE, 1st Hw—same as A1.
 2. Read BALE, 2nd Hw—same as A2.
C. End of Message (Normal):
 1. Write BALE, 1st Hw—write last block indicator bit, byte count (remaining in buffer), and last bit count.
 2. Write Term Entry—write channel no., BALE pointer of last buffer, and errors.
D. End of Message (Buffer Recovery):
 1. Write BALE, 1st Hw—reset ACT bit of first buffer used for lost message.
 2. Write Term Entry—Write channel no., BALE point of first buffer, and errors.

These memory accesses along with Read Data (RD) for Transmit and Write Data (WD) for Receive have been grouped together into Memory Sequences. The following is a list of these Memory Sequences as they appear in ICC documentation.

I. Transmit
 MS1=RB2, RD, WB1S (part of start buffer)
 MS2=TER, RB1 (error termination)

MS3 = TE, RB1 (normal termination)
II. Receive
MS1 = RB1, RB0, WD, WB1S (start of message)
MS2 = WB1S, TER (error termination)
MS3 = RB1, RB2 (new buffer)
MS4 = WB1S, TE (normal termination)

Abbreviations

MS—Memory Sequence
WB1S—Write BALE 1st halfword (start)
RB2—read BALE 2nd halfword
RD—read data
WD—write data
TE—term entry (normal)
TER—term entry (error)

FIGS. 5-16 disclose flow diagrams for ICC operation for transmit and receive functions of the ICC when using ADCCP procedures. It should be noted that the ICC is a bit-oriented unit. For every bit that is transferred to the Device Port the ICC must perform some function and make some decision. The following Tables delineate the various memory and processing states and their affiliated mnemonics, diagram key and code. This information will be useful in understanding the ICC Flow Diagrams.

TABLE V
RECEIVE MEMORY PROCESSING STATE CODES

| State Reason | Mnemonic | Diagram Key | Code 5432 |
|---|---|---|---|
| Read - Bale (2nd Hw) | MS11 | A | 1000 |
| Read - Bale (1st Hw) | MS12 | B | 1001 |
| Write - Bale (2nd Hw) | MS2 | D | 1010 |
| Read - Bale (2nd Hw) | MS3 | E | 1011 |
| Write - Bale (2nd Hw) | MS4 | F | 1100 |
| Bale (1st Hw) | RB0 | G | 1101 |
| Write - Normal TE | Te | J | 1110 |
| Write - Error TE | TER | K | 1111 |
| Data Access | MS13 | C | 0001 |
| Write - Bale (2nd Hw) | WB1S | I | 0010 |

TABLE VI
TRANSIT MEMORY PROCESSING STATE CODES

| State Reason | Mnemonic | Diagram Key | Code 432 |
|---|---|---|---|
| Read - Bale (1st Hw) | MS11 | A | 001 |
| Data | MS12 | B | 010 |
| Write - Error TE | MS21 | C | 011 |
| Write - Normal TE | MS3 | D | 100 |
| Bale (2nd Hw) | RB1 | E | 101 |
| Bale (1st Hw) | RB0 | F | 110 |
| Write - Bale (2nd Hw) | WB1S | H | 111 |

TABLE VII
RECEIVE CHARACTER PROCESSING STATE CODES

| State Reason | Diagram Key | Code 321 |
|---|---|---|
| Idle | A | 000 |
| Flag | B | 001 |
| Data | C | 010 |

TABLE VIII
TRANSMIT CHARACTER PROCESSING STATE CODES

| State Reason | Diagram Key | Code 321 |
|---|---|---|
| Data | A | 010 |
| CRC | B | 011 |
| E Flag | C | 000 |
| Flag | D | 001 |
| Abort | E | 100 |

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with an automatic digital telecommunications system having a computer including a central processing unit with a core memory, and a multiplicity of duplex serial data channels, said serial data channels being terminated in a channel buffer, an interactive communications channel providing said central processing unit with multichannel interfaces and message traffic by scanning said multiplicity of serial data channels, in response to instructions from said central processing unit, and sending message traffic to be stored in said core memory when operating in an input mode of operation, and receiving said message traffic from said core memory and transmitting it out over said serial data channels when in an output mode of operation; said interactive communication channel comprising:

a device port interface receiving and transmitting data packets for said multiplicity of serial data channels between said channel buffer and said interactive communications channel;

a central processing unit interface entering and extracting data packets out of said central processing unit's core memory for communication and transfer by said interactive communications channel over said serial data channels; said central processing unit interface having a conditions unit which contains an "activate" bit for each of said serial data channels, each of said "activate" bits capable of being set by a buffer area list entry which is generated by said interactive communications channel to accompany each of said data packets when they are entered into said central processing unit's core memory, each of said "activate" bits being reset by said instructions from said central processing unit which direct said output mode of operation, each of said activate bits also being capable of being reset when queued by its serial data channel in a request for a message;

a memory means, entering and extracting data packets into said central processing unit interface in data blocks which have a size of two bytes, said memory means maintaining a buffer area list entry for each received message said buffer area list entry containing: a one bit signal to set said "activate" bit in said conditions unit in said central processing unit interface; a block byte count which indicates the amount of memory space available in said central processing unit, a data address indicating the planned location of the start of said data packet in the memory space of said central processing unit, and a last block indicator which indicates a planned location of the end of said data packet in the memory space of said central processing unit, said memory means temporarily storing and transferring a cyclic redundancy check for each of said data packets, said cyclic redundancy check being a quality test for transmission errors in said data packets;

a first updating means receiving said block byte count and a memory bus signal from said memory means, said first updating means outputting an updated block byte count to said memory means by incrementing the value of said block byte count by two when said memory bus signal indicates that said interaction communications channel is outputting data from said central processing unit to said serial data channels, and decrementing said block byte count by two when said interactive communications channel is inputting data from serial data channels into said central processing unit;

a second updating means serving as an elapsed time counter for testing each of said serial data channels to see if a request has been sent for a transmission by documenting a byte count of a programmable number each time an inactive channel is scanned, and testing said "activate" bit for said inactive channel in said conditions unit in said central processing unit interface when said byte count reaches binary zero;

a scan counter sending a start-of-scan signal to said second updating means each time an inactive channel is scanned;

a checking means producing a first checking signal by performing a first cyclic reduncancy check on incoming data packets received from said device port interface, said checking means checking said data packets for errors upon transmission by said interactive communications channel by: receiving said first checking signal and said data packets from said memory means, performing a second cyclic redundancy check, and comparing the results of said second cyclic redundancy check with said firt checking signal, and said checking means sending a second checking signal when the results of said second cyclic redundancy check favorably compare with said first checking signal;

a bit stuffing control means producing an output signal by receiving said data packets from said checking means and stripping all stuffed bits from said data stream when said data stream is being received from said serial data channels, said bit stuffing control means restoring stuffed bits to said data stream when said data stream is being transmitted out to said serial data channels; said bit stuffing control means containing a control bit counter, said control bit counter detecting a flag character in said data packets, said flag character being a particular binary signal which indicates the conclusion of any message in said data packets, said bit stuffing control means sending its output signal to said memory means with said data packets being received from said serial data channels, said bit stuffing control means sending its output signal to said device port interface when said data packets are being transmitted out said serial data channels.

2. An interactive communications channel as defined in claim 1, including panel display means, said panel display means providing a display of channel memory for selected memory field, interactive communications channel time slots and operating data and registers, said panel display means exchanging display signals with said memory means.

3. An interactive communications channel as defined in claim 2, wherein said central processing unit interface comprises;

a flip flop generating interrrupt signal after each said buffer area list entry is input into said memory means, said interrupt signal thereby informing said central processing unit that a received message requires processing;

an ICCON indicator which receives a control signal from said central processing unit which serves to turn on and off said interactive communications channel, said ICCON indicator serving as a switch which allows said interactive communications channel to transmit and retrieve data between said serial data channels and said central processing unit only when said interactive communications channel is on;

a first and second bus, said first bus electrically connecting said central processing unit interface to said central processing unit and conducting said instructions from said central processing unit into said interactive communications channel, said instructions including a binary signal to reset said "activate" bit in said conditions unit, said first bus conducting said control signal from said central processing unit to said ICCON indicator, and said first bus conducting said interrupt signal from said flip flop to said central processing unit, said second bus conducting said buffer area list entry and said data packets betweem said central processing unit's core memory and said memory means;

a first memory multiplexer conducting said buffer area list entry and data from said memory means into said second bus;

a second memory multiplexer conducting said output signal of said conditions unit into said second bus and into said memory means, said second memory multiplexer conducting all reset signals queued by said serial data channels from said memory means to said conditions unit, said second memory multiplexer conducting a triggering signal from said memory means to said flip flop each time a buffer area list entry is input into said memory means, and said second memory multiplexer conducting a data address and said first checking signal of data packets from said core memory to said memory means when in said output mode of operation;

an access unit receiving said control signal from said first bus, and providing a data path for said central processing unit to said second memory multiplexer to allow said central processing unit to load said memory means with initial operational data when said control signal indicates said interactive communications channel is off, said initial operational data including an initial value for said block byte count, said initial value indicating an amount of memory space available in said central processing unit's core memory.

4. An interactive communications channel as defined in claim 3, wherein said memory means comprises:

a random access memory being partitioned to provide about 256 bits of memory storage for each of said serial data channels and being further partitioned into discrete information areas for said cyclic redundancy check and said buffer area list entry for each of said data packets;

random access memory multiplexer means receiving all data from said serial data channels in the form of said output signal from said bit stuffing control means and conducting said data into said memory menas, said random access memory multiplexer means receiving and conducting said updated block byte count from said first updating means into said random access memory, said random access memory multiplexer means conducting signals produced said second updating means into said random access memory; said random access memory multiplexer means conducting said data and said buffer area list entry from said central processing unit's core memory into said memory means when said interactive communications channel is transmitting data over said serial data channels, said random access memory multiplexer means transferring display signals between said panel display means and said random access memory;

register means conducting said data and said buffer area list entry from said random access memory into said first memory multiplexer in said central processing unit interface.

5. An interactive communications channel as defined in claim 4, wherein said random access memory multiplexer means comprises:

third, fourth, fifth and sixth memory multiplexers, said third memory multiplexer receiving said data address and said first, checking signal of data packets from said second memory multiplexer when said interactive communications channel is in an output mode of operation, said third memory multiplexer sending a display signal to said panel display means which indicates if said interactive communications channel is in an output mode of operation;

said fourth memory multiplexer receiving buffer area list entry information including said last block indicator from said second bus in said central processing unit interface, and conducting said buffer area list information into said random access memory, said fourth memory multiplexer transferring said display signals between said panel display means and said random access memory;

said fifth and sixth memory multiplexers conducting data from said serial data channels into said random access memory in the form of output signals from said bit stuffing control means, when in said input mode of operation, said fifth and sixth memory multiplexers conducting buffer area list information and all data from said second bus in said central processing unit interface into said random access memory when in said output mode of operation, said fifth and sixth memory multiplexers transferring said display signals between said panel display means and said random access memory;

a panel bus conducting said display signals between said panel display means and said third, fourth, fifth and sixth memory multiplexers; and a memory bus conducting said data packets with its associated buffer area list entry information from said second bus in said central processing unit interface into said third, fourth, fifth and sixth multiplexers when said interactive communications channel is in said output mode of operation.

6. An interactive communications channel as defined in claim 5 wherein said register means comprises:

a cyclic redundancy check register receiving said data address and buffer area list entry information including said data address and said last bit indicator and said first checking signal from said random access memory into said first memory multiplexer when in said input mode of operation, said cyclic redundacny check register sending said first checking signal from said random access memory to said checking means when in said output mode of operation;

first, second, third and fourth output registers transferring said data with its buffer area list entry ingormation, including said block byte count into said first memory multiplexer when in said input mode of operation, and sending said data into said checking means and said bit stuffing means when in said output mode of opertion, said second output register sending said block byte count from said random access memory to said first updating means to be decremented when in said output mode of operation.

7. An interactive communications channel as defined in claim 6 wherein said first updating means comprises:

an updating multiplexer receiving and transferring a block byte count from said second output register and an indicator signal from said memory bus, said indicator signal indicating if said interactive communications channel is in said input and said output mode of operation; and an updating counter outputting said updated block byte count to said fifth memory multiplexer in said memory means by incrementing said byte count by two when said indicator signal is in said output mode of operation, and decrementing said byte count by two when said indicator signal is in said input mode of operation.

8. An interactive communications channel as defined in claim 7, wherein said checking means comprises:

a checking register which produces said first checking signal by receiving and counting the bits in said data signals received from said device port interface in said input mode of operation, said checking register sending said first checking signal to said fourth memory multiplexer in said memory means, said checking register producing said second checking signal by receiving and counting the bits in said data signals received from said second output register in said register means and comparing it with said first checking signal received from said cyclic redundancy check register in said register means during said output mode of operation, said checking register, said second checking signal being sent to said fourth memory multiplexer to indicate whether a favorable comparison occurs.

* * * * *